(12) United States Patent
Johns et al.

(10) Patent No.: US 9,432,383 B2
(45) Date of Patent: Aug. 30, 2016

(54) WEB PAGE INTEGRITY VALIDATION

(71) Applicants: Martin Johns, Karlsruhe (DE);
Sebastian Lekies, Karlsruhe (DE)

(72) Inventors: Martin Johns, Karlsruhe (DE);
Sebastian Lekies, Karlsruhe (DE)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 14/341,591

(22) Filed: Jul. 25, 2014

(65) Prior Publication Data

US 2016/0028743 A1 Jan. 28, 2016

(51) Int. Cl.
*H04L 29/06* (2006.01)
*G06F 17/22* (2006.01)

(52) U.S. Cl.
CPC ......... *H04L 63/123* (2013.01); *G06F 17/2247* (2013.01)

(58) Field of Classification Search
CPC ...... G06F 21/56; G06F 21/566; G06F 21/50; G06F 21/52; G06F 21/55; G06F 21/554; H04L 63/1466; H04L 63/12; H04L 63/123; H04L 63/14; H04L 63/145
See application file for complete search history.

(56) References Cited

U.S. PATENT DOCUMENTS

| | | | |
|---|---|---|---|
| 8,914,881 B2 | 12/2014 | Lekies et al. | |
| 2013/0086247 A1* | 4/2013 | Burckart | H04L 67/2823 709/224 |
| 2013/0254855 A1* | 9/2013 | Walters | G06F 21/60 726/5 |
| 2014/0373087 A1* | 12/2014 | Ciu | H04L 63/145 726/1 |
| 2016/0028742 A1* | 1/2016 | Johns | H04L 63/123 726/26 |

OTHER PUBLICATIONS

Marco Balduzzi, Manuel Egele, Engin Kirda, Davide Balzarotti, and Christopher Kruegel. A solution for the automated detection of clickjacking attacks. In AsiaCCS, 2010.
Ryan Barnett. Detecting Successful XSS Testing with JS Overrides. Blog post, Trustwave SpiderLabs, http://blog.spiderlabs.com/2012/11/detecting-successful-xss-testing-with-js-overrides.html, last accessed Jul. 4, 2013, Nov. 2012.
Adam Barth, Collin Jackson, and John C. Mitchell. Robust Defenses for Cross-Site Request Forgery. In CCS'09, 2009.
Douglas Crockford. Private Members in JavaScript. [online],http://www.crockford.com/javascript/private.html, (Nov. 1, 2006), 2001.
Chris Grier, Shuo Tang, and Samuel T. King. Secure Web Browsing with the OP Web Browser. In IEEE Symposium on Security and Privacy, 2008.
Robert Hansen and Jeremiah Grossman. Clickjacking. [online], http://www.sectheory.com/clickjacking.htm, Aug. 2008.

(Continued)

*Primary Examiner* — Dede Zecher
*Assistant Examiner* — Richard McCoy
(74) *Attorney, Agent, or Firm* — Brake Hughes Bellermann LLP

(57) ABSTRACT

An aspect identifier of an integrity validation script may be provided to a browser application, that, during execution thereof by the browser application when rendering a page, identifies a document object model (DOM) aspect of a DOM of the page. A copy generator of the integrity validation script may be provided to the browser application that, during execution thereof by the browser application when rendering the page, generates a copy of the identified DOM aspect. The integrity validation script is configured to test an integrity of the DOM based on attempted deletion of the identified DOM aspect, while maintaining the identified DOM aspect through the copy thereof.

20 Claims, 8 Drawing Sheets

(56) References Cited

OTHER PUBLICATIONS

Mario Heiderich, Tilman Frosch, and Thorsten Holz. Iceshield: Detection and mitigation of malicious websites with a frozen dom. In RAID 2011.
Brad Hill. Adaptive user interface randomization as an anti-clickjacking strategy, May 2012.
Brad Hill. Anti-clickjacking protected interactive elements, Jan. 2012.
Lin-Shung Huang and Collin Jackson. Clickjacking attacks unresolved. White paper, CyLab, Jul. 2011. Available online.
Lin-Shung Huang, Alex Moshchuk, Helen J. Wang, Stuart Schechter, and Collin Jackson. Clickjacking: attacks and defenses. In USENIX Security, 2012.
Sotiris Ioannidis and Steven M. Bellovin. Building a secure web browser. In USENIX Technical Conference, 2001.
Martin Johns and Justus Winter. RequestRodeo: Client Side Protection against Session Riding. In OWASP Europe 2006, refereed papers track, May 2006.
Krzysztof Kotowicz. Cursorjacking again. http://blog.kotowicz.net/2012/01/cursorjacking-again.html, Jan. 2012.
Sebastian Lekies, Mario Heiderich, Dennis Appelt, Thorsten Holz, and Martin Johns. On the fragility and limitations of current browser-provided clickjacking protection schemes. In WOOT 2012.
Giorgio Maone. Noscript clearclick. http://noscript.net/faq#clearclick, Jan. 2012.
Giorgio Maone, David Lin-Shung Huang, Tobias Gondrom, and Brad Hill. User Interface Safety Directives for Content Security Policy. W3C Working Draft 20, http://www.w3.org/TR/UISafety/, Nov. 2012.
Microsoft. IE8 Security Part VII: ClickJacking Defenses, 2009.
Sorin Mustaca. Old Facebook likejacking scam in use again. [online], Avira Secu-rity Blog, http://techblog.avira.com/2013/02/11/old-facebook-likejacking-scam-in-use-again-shocking-at-14-she-did-that-in-the-public-school/en/, Feb. 2013.
Mozilla Developer Network. delete. [online], https://developer.mozilla.org/en-US/docs/JavaScript/Reference/Operators/delete, Feb. 2013.
N. Nikiforakis, L. Invernizzi, A. Kapravelos, S. Van Acker, W. Joosen, C. Kruegel, F. Piessens, and G. Vigna. You Are What You Include: Large-scale Evaluation of Remote JavaScript Inclusions. In CCS 2012.
Phu H. Phung, David Sands, and Andrey Chudnov. Lightweight self-protecting javascript. In ASIACCS 2009.
Jesse Ruderman. Bug 154957—iframe content background defaults to transparent. https://bugzilla.mozilla.org/show bug.cgi?id=154957, Jun. 2002.
Gustav Rydstedt, Elie Bursztein, Dan Boneh, and Collin Jackson. Busting frame busting: a study of clickjacking vulnerabilities at popular sites. In IEEE Oakland Web 2.0 Security and Privacy (W2SP 2010).
Eric Shepherd. window.postmessage. [online], https://developer.mozilla.org/en/DOM/window.postMessage, Oct. 2011.
SophosLabs. Clickjacking. [online], http://nakedsecurity.sophos.com/2010/05/31/facebook-likejacking-worm/, last accessed Apr. 7, 2013, May 2010.
Helen J. Wang, Chris Grier, Alexander Moshchuk, Samuel T. King, Piali Choud-hury, and Herman Venter. The Multi-Principal OS Construction of the Gazelle Web Browser. In USENIX Security Symposium, 2009.
C. Wisniewski. Facebook adds speed bump to slow down likejackers, Mar. 2011.
Michael Zalewski. X-frame-options is worth less than you think. Website, Dec. 2011. Available online: http://camtuf.coredump.cx/clickit/.
Juriy Zaytsev. Understanding delete. [online], http://perfectionkills.com/understanding-delete/, Jan. 2010.

* cited by examiner

600

Provide, to a browser application, an aspect identifier of an integrity validation script that, during execution thereof by the browser application when rendering a page, identifies a document object model (DOM) aspect of a DOM of the page
602

Provide, to the browser application, a copy generator of the integrity validation script that, during execution thereof by the browser application when rendering the page, generates a copy of the identified DOM aspect, wherein the integrity validation script is configured to test an integrity of the DOM based on attempted deletion of the identified DOM aspect, while maintaining the identified DOM aspect through the copy thereof
604

FIG. 6

WEB PAGE INTEGRITY VALIDATION

TECHNICAL FIELD

This description relates to web page security.

BACKGROUND

In the early days of the internet, a webpage was a static document that was provided from a server to a client, e.g., a browser application. Later, providers gained an ability to provide functionality in conjunction with content.

Over time, providers developed a desire and an ability to integrate content and/or functionality from a separate provider, i.e., a third party provider in the context of the traditional server/client exchange. In this paradigm, providers are able to provide their users with additional features, for the use and enjoyment of the users, while the third party providers are able to propagate their services over a wide audience.

However, these and related advantages are offset in practice by the presence of malicious providers, and/or malicious third party providers. For example, a malicious provider may attempt to integrate third party services in a manner which enables the malicious provider to attack the third party provider and/or the end user. Conversely, a malicious third party provider may attempt to have its services integrated by an innocent provider, so as to thereby attack the innocent provider and/or the end user. As a result, it is difficult for legitimate providers, third-party providers, and end users to trust content and functionality that is available on the Internet.

SUMMARY

According to one general aspect, a system may include at least one processor, and instructions that, when executed by the at least one processor, cause the at least one processor to provide, to a browser application, an aspect identifier of an integrity validation script that, during execution thereof by the browser application when rendering a page, identifies a document object model (DOM) aspect of a DOM of the page. The instructions, when executed by the at least one processor, further cause the at least one processor to provide, to the browser application, a copy generator of the integrity validation script that, during execution thereof by the browser application when rendering the page, generates a copy of the identified DOM aspect. The integrity validation script is configured to test an integrity of the DOM based on attempted deletion of the identified DOM aspect, while maintaining the identified DOM aspect through the copy thereof.

According to another general aspect, a computer-implemented method for executing instructions stored on a non-transitory computer readable storage medium may include executing an integrity validation script at a browser application to thereby test an integrity of a document object model (DOM) aspect of a DOM of a page rendered by the browser application. The executing may include generating a copy of the identified DOM aspect, executing an attempted deletion of the identified DOM aspect, while maintaining the identified DOM aspect through the copy thereof, and determining the integrity of the DOM aspect, based on the attempted deletion.

According to another general aspect, a computer program product tangibly embodied on a non-transitory computer-readable storage medium may include instructions that, when executed by at least one processor, are configured to provide, to a browser application, an aspect identifier of an integrity validation script that, during execution thereof by the browser application when rendering a page, identifies a document object model (DOM) aspect of a DOM of the page. The instruction, when executed by the at least one processor, are further configured to provide, to the browser application, a copy generator of the integrity validation script that, during execution thereof by the browser application when rendering the page, generates a copy of the identified DOM aspect. The integrity validation script may be configured to test an integrity of the DOM based on attempted deletion of the identified DOM aspect, while maintaining the identified DOM aspect through the copy thereof.

The details of one or more implementations are set forth in the accompanying drawings and the description below. Other features will be apparent from the description and drawings, and from the claims.

BRIEF DESCRIPTION OF THE DRAWINGS

FIG. 6 is a flowchart illustrating example operations of the system of FIG. 5.

DETAILED DESCRIPTION

Figure 1:
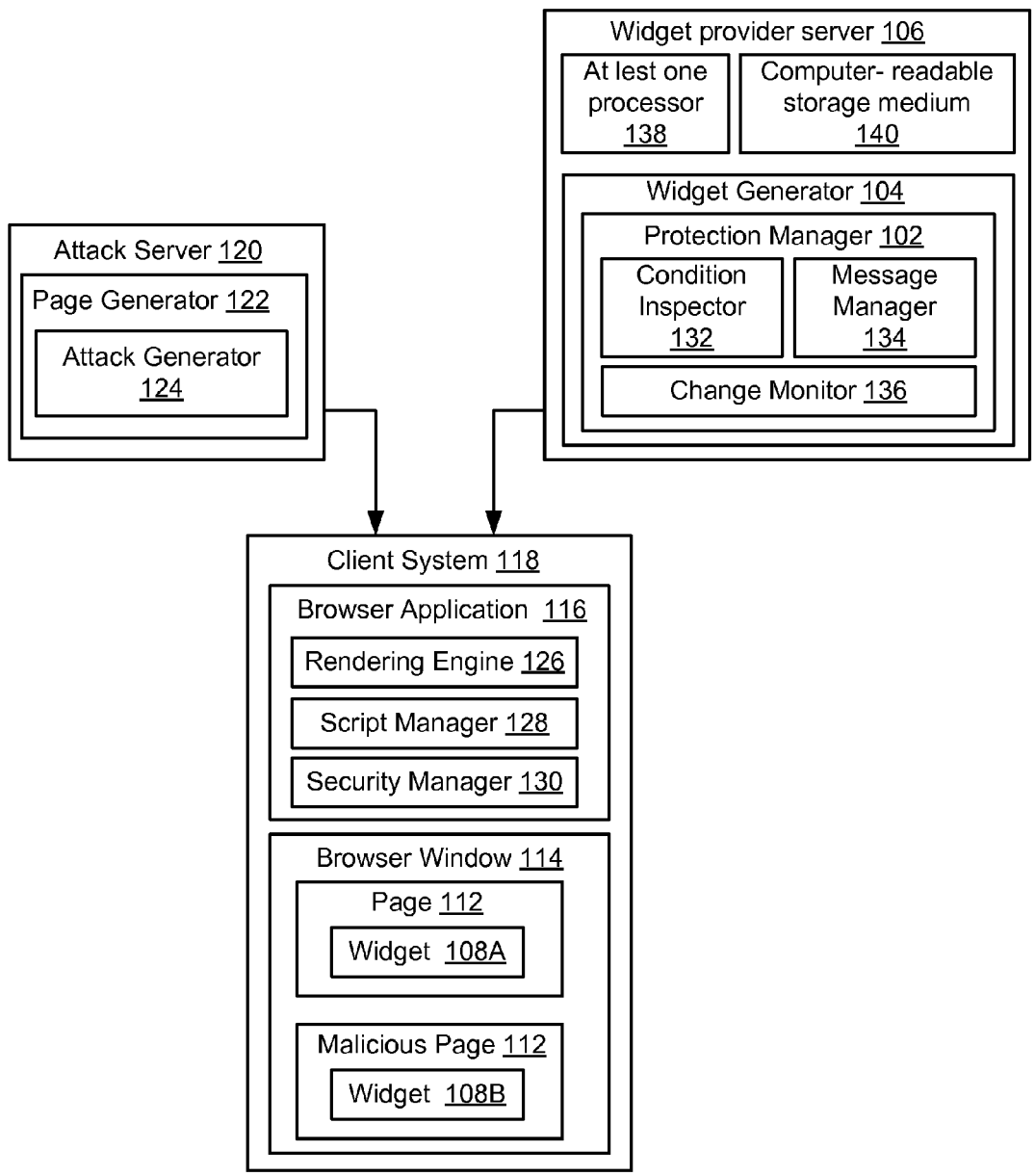
FIG. 1 is a block diagram of a system for condition checking for page integration for third party services.

FIG. 1 is a block diagram of a system 100 for condition checking for integration of third party services. In the example of FIG. 1, a protection manager 102 is illustrated as being provided within a widget generator 104, executing in the context of a widget provider server 106. In operation, the widget generator 104 provides a widget, illustrated in the example of FIG. 1 as widgets 108A, 108B, executing in conjunction with (e.g., embedded in) pages 110, 112, respectively.

More specifically, the page 110 is assumed, for the sake of the example, to be a webpage provided in good faith by a legitimate provider, so that the widget 108A should be free to provide any relevant third party service provided by the widget provider server 106 when embedded in the page 110. By way of contrast, the widget 108B is illustrated as being provided within a malicious page 112, so that, as described in detail below, the widget 108B should be partially or completely restricted from operating in, or being included in, the malicious page 112, for fear of exposing the third party provider of the widget provider server and/or an end user of the malicious page 112 and the widget 108B to one or more potential attacks associated with the malicious page 112. Therefore, as described in detail below, in order to circumvent or avoid any malicious intent associated with the malicious page 112, the protection manager 102 may be configured to provide a protection script in conjunction with the widget 108B, so that the widget 108B is only permitted to function, if at all, in a manner that guards against any malicious intent associated with the malicious page 112.

In the example of FIG. 1, the pages 110, 112 are illustrated as being provided within a browser window 114 of a browser application 116, which is itself provided by a client system 118. For example, the client system 118 may include or represent virtually any desktop, laptop, notebook, or netbook computer, or any tablet, smartphone, or personal mobile device. Thus, the browser application 116 may represent any current or future browser application that may be implemented by the types of client systems just referenced. In the context of any such browser application, the browser window 114 may thus represent one or more windows or tabs that may be used to display the page 110 and/or the malicious page 112. For example, in one implementation, the page 110 may be displayed within the browser window 114 at a first time, while the malicious page 112 may be displayed within the browser window 114 at a second time. In other examples, the browser window 114 may be understood to represent different browser windows, perhaps on different client systems.

Thus, the client system 118 should be understood to represent, or include, virtually any arbitrary system that may be capable of receiving and rendering the pages 110, 112 and the widgets 108A, 108B. In other words, an attack server 120 that provides the malicious page 112 may intend for the malicious page 112 to be generally and publicly available, just as the legitimate page 110 (provided by a corresponding legitimate server, not explicitly illustrated in the example of FIG. 1) may be generally and publicly available. Moreover, in the example, the widget provider server 106 may be configured to allow integration or embedding of the widgets 108A, 108B within all such pages, without prior knowledge of an identity of the providers of such pages, but nonetheless under the protection of the protection manager 102.

In the example of FIG. 1, the attack server 120 is illustrated as including a page generator 122 that is configured to generate the malicious page 112, as well as an attack generator 124 that is configured to execute one or more actions designed to take advantage of resources of the widget provider server 106 and/or an end user of the malicious page 112 and the widget 108B, in an illegal, illicit, or otherwise undesirable manner. Specific examples of such attacks, by themselves, would be known to one of skill in the art, and a number of such examples are provided in detail below for the sake of illustration and explanation, particularly in connection with the example use case of FIG. 8.

In the example of FIG. 1, the protection manager 102 protects against such attacks, without requiring specific knowledge of implementations of the attacks, of the attack server 120, or of the malicious page 112. Instead, as described in detail below, the protection manager 102 may provide such protection against attacks of the attack server 120, using existing, conventional functionalities of the browser application 116, while also taking into account existing security measures implemented by the browser application 116.

For example, as shown, the browser application 116 may include a conventional rendering engine 126, that is configured to receive page related code from the page generator 122 and the widget generator 104, for rendering thereof within the browser window 114. For example, the rendering engine 126 may receive hypertext markup language (HTML) code from the page generator 122, and may parse the HTML code to construct a document object model (DOM), that may then be traversed by the rendering engine 126 to render the malicious page 112. Similar comments would of course apply to operations of the rendering engine 126 in rendering the widgets 108A, 108B, as well as the legitimate page 110.

The use of a DOM in such context is generally known, and is therefore not described herein in detail. However, various features and functions of the rendering engine 126 are relevant for understanding operations of the protection manager 102 in the context of the system 100 of FIG. 1, so that explanation of such features and functions are provided below for that reason. For example, it should be appreciated that the DOM generally represents a language independent, cross platform technique for providing objects within web documents (e.g., HTML documents, eXtensible Markup Language (XML) documents, and other available markup languages), in a manner which governs the ways in which the end user sees and otherwise interacts with a rendered page. Typically, a DOM may be represented in a hierarchical, tree structure, in which parent and child nodes or objects are connected. DOM tree objects may then be utilized through available methods associated therewith, as specified in an application programming interface (API) of the DOM.

One aspect of the DOM is its ability to implement and execute java script code, which, as is known, includes dynamic computer code represented in the java script programming language, which is often utilized to enable interactions with an end user, control the browser application 116, and alter content and functions of pages that are rendered, among other functionalities and capabilities. In the example of FIG. 1, the browser application 116 is thus illustrated as including a script manager 128, that may be configured to receive and execute such java script code, using associated java script APIs. Although the script manager 128 is illustrated separately from the rendering engine 126 for purposes of illustration and explanation, it would be appreciated by one of skill in the art that execution of such client side scripts may generally occur in conjunction with a rendering of a relevant page, and may in fact, as referenced above, control or influence the manner in which a given page is ultimately rendered, as well as governing functionalities of the rendered page.

Finally with respect to the browser application 116, a security manager 130 is illustrated which represents available security functionality that may conventionally be provided within the browser application 116. For example, the security manager 130 may implement a same origin policy as part of a webpage security model. Within such a security model, the same origin policy may cause the security manager 130 to determine whether two or more pages originate from the same site or server. Then, for pages originating from the same site, the security manager 130 may enable communication there between. For example, two such pages may be capable of accessing each other's DOM with no specific restrictions. On the other hand, for two pages originating from different origins, the security manager 130 may partially or completely restrict such access, perhaps in conjunction with providing limited, specific techniques that may be used by the two cross origin pages to communicate with one another.

Thus, the browser application 116, generically representing a number of different examples of current and future browsers, provided by a number of different providers, may each include conventional features and functions that are designed to provide a rich, interactive experience with an end user of the browser 114. However, as referenced above, in many cases, these very features and functions of the browser application 116 may also be utilized by the attack server 120 to generate the malicious page 112 in a manner which is designed to take advantage of the widget provider server 106 and/or the end user, in an illegal, illicit, or otherwise undesirable manner.

For example, in the example of FIG. 1, the widget provider server 106 may be implemented by a widget provider which provides certain features, functions, or other services, and which intends to reach a wide and diverse audience of end users, and which intends to interact with such end users in a manner which encourages long-term relationships between such users and the widget provider. For example, as described in detail below, such a widget provider may include a social sharing service, which seeks to connect end users with one another. In such contexts, the widget generator 104 may provide the widgets 108A, 108B in the form of buttons or other icons which are embedded within the pages 110, 112 for the purpose of allowing end users to quickly, conveniently, and seamlessly share the content of the pages 110, 112 with other end users within the social sharing service provided by the widget provider.

In such scenarios, the widgets 108A, 108B enable an end user to broadcast, upload, transmit, or otherwise share content of the pages 110, 112 to the public at large, or with specified groups of acquaintances, colleagues, customers, or other intended recipients. In these scenarios, the widget provider implementing the widget provider server 106 generally intends for the widgets 108A, 108B, and other widgets provided by the widget generator 104, to be included within a large number and type of pages, so as to encourage interaction with, and other use of, the social sharing services of the widget provider. Meanwhile, for legitimate content providers, such as a provider of the page 110, it is also desirable to include widgets of the widget generator 104, so as to more effectively make content of the page 110 available to a wide audience.

Thus, the legitimate page provider and the widget provider may both have an interest in encouraging fast, convenient, seamless interaction with the end user of the browser window 114. For example, the legitimate page provider and the widget provider may seek to cause the widget 108A to appear seamlessly within the page 110, as if the widget 108A is a part of the page 110. Further, the widget provider server 106 may provide the widget 108A in a manner which enables the end user to interact with resources of the widget provider server 106, so that, in that sense, the widget 108 may be understood to be security sensitive with respect to the resources of the widget provider server 106. Thus, all requests received from the widget 108A may be treated as being received from the end user, and, moreover, the end user may be enabled to provide such requests very quickly and efficiently, often using only a single click or selection of the widget 108A to implement and execute an associated functionality thereof.

The features of the browser application 116 described above in conjunction with the rendering engine 126, the script manager 128, and the security manager 130, and other related features and functions, are designed to provide such fast, convenient, seamless interactions, and in a manner which minimizes compromises to a security of the widget provider server 106 and the end user. However, as referenced above, the attack server 120 may nonetheless take advantage of the context and manner in which the browser application 116 conventionally provides the widgets 108A, 108B, using the very features of the browser application 116 relied on by the page 110 and the widget provider of the widget provider 106. Specifically, for example, the attack generator 124 may be configured to include java script code of its own that is designed to create a condition within the malicious page 112 when the malicious page 112 is rendered within the browser window 114, where the resulting condition is designed to take advantage of the characteristics of the widget 108B described above (e.g., fast, convenient, seamless interactions with the end user). Such an attack script may be provided by the attack generator 124 with the intent of converting an otherwise legitimate page into the malicious page 112, or may be provided directly in conjunction with the malicious page 112 when generated by the page generator 122. In other example scenarios, the malicious page 112 may originally be structured to create a dangerous or undesired condition within the malicious page 112 and with respect to the widget 108B, such as when a DOM tree of the malicious page 112 is structured to create the dangerous or undesired condition.

Thus, the protection manager 102 is illustrated as including a condition inspector 132 that inspects the malicious page 112 for the existence of the dangerous or undesired condition in question. In the following description, in particularly with respect to the use case scenario of FIG. 8, the condition may include a visibility condition, according to which the widget 108B is required to be visible within the malicious page 112, so that interactions of the end user with the widget 108B are ensured to represent actual, desired interactions of the end user. In these examples, then, the malicious page 112 is prevented from leveraging a security sensitive nature of the widget 108B to induce the end user to perform an action which compromises a security of the widget provider server 106, or of the end user. For example, the malicious page 112 may be structured to provide a user interface (UI) element that hides the widget 108B, and that induces the end user to select an apparent function of the obscuring UI element, which in fact causes the end user to unknowingly implement a functionality of the widget 108B that is desired by the attacker implementing the attack server 120, and that compromises the security of the widget provider server 106 and/or the end user.

Many specific example techniques that may be used in conjunction with the malicious page 112 to attempt to violate a visibility condition of the widget 108B are provided below, in conjunction with associated techniques for compromising a security of the widget provider server 106 and/or the end user, through a leveraging of the security sensitive, embedded nature of the widget 108B. However, it will be appreciated that such visibility conditions are intended merely to provide illustrative, non-limiting examples of the types of conditions that may be detected by the condition inspector 132, and that may be utilized by the attack generator 124 in attempting to compromise a security of the widget provider server 106 and/or the end user.

More generally, the condition inspector 132 may be configured to detect any condition that may be undesirable to the widget provider, with respect to providing widgets of the widget generator 104 within webpages. That is, such conditions may not necessarily be associated with a direct compromise of a security of the widget provider server 106 and/or the end user, and, instead, may simply represent conditions that are unacceptable or undesired by the widget provider 106. For example, the condition inspector 132 may inspect the pages 110, 112 for an inclusion of undesirable content, such as when the widget provider does not want widgets of the widget generator 104 to be included in illicit or illegal pages, irrespective of security concerns of the widget provider. Similarly, and notwithstanding the above-referenced scenarios in which the widget provider wishes to have widgets of the widget generator 104 included in any arbitrary, publicly available webpage, the widget provider may simply desire, for personal, professional, legal, or ethical reasons, to avoid or prevent inclusion of widgets of the widget generator 104 within webpages meeting certain criteria used by the condition inspector 132.

In these and various other scenarios, once the condition inspector 132 determines a possible inclusion of a condition that is not permitted within the context of any page hosting an associated widget of the widget generator 104, such as the widget 108B, a message manager 134 of the protection manager 102 may disable, or prevent an enabling, of the functionality (or a portion thereof) of the associated widget. More particularly, as described in detail below, the message manager 134 may be configured to affect the associated widget in a desired manner, and in a secure and reliable manner that is impervious to attempts of the attack generator 124 to circumvent. For example, in the examples provided above in which the condition inspector 132 is configured to inspect a visibility condition of the widget 108B, the message manager 134 ensures that the visibility condition determined by the condition inspector 132 is accurately and completely provided and implemented in the context of affecting associated functionality of the relevant widget.

Finally in the context of the protection manager 102, a change monitor 136 may be configured to execute after completion of an initial determination of the condition inspector 132, in order to ensure that the underlying condition is not altered in an undesired manner at some later time. For example, and again with respect to the example in which the condition inspector 132 inspects for a visibility condition of the widget 108B, it may occur that the condition inspector 132 initially determines that the widget 108B is visible, so that the message manager 134 proceeds to fully enable available functionality of the widget 108B. However, at some subsequent time, the malicious page 112 may execute in a manner which violates the required visibility condition of the widget 108B.

Therefore, the change monitor 136 may, for example, directly detect circumstances which may potentially be associated with violations of the required visibility condition. In response, the condition inspector 132 and the message manager 134 may proceed to recheck the visibility condition, and to modify a functionality of the widget 108B accordingly, if needed. Additionally, or alternatively, the change monitor 136 may be configured to cause the condition inspector 132 and the message manager 134 to recheck the required visibility condition of the widget 108B in a specified manner, e.g., in a random manner.

In example implementations, the protection manager 102 may itself be implemented as generating a java script code portion, e.g., as a java script library that is included within all widgets generated by the widget generator 104. Example implementation details regarding the use of such protection scripts in the system 100 of FIG. 1 are provided below, e.g., with respect to FIGS. 2-4. In this regard, although the widget generator 104 is described above as generating the widgets 108A, 108B as small, embedded icons in the context of the larger pages 110, 112, such implementations should be understood as illustrative, non-limiting example implementations. Specifically, widgets provided by the widget generator 104 may themselves be understood to range in size, appearance, and functionality, and thus may include a large number and variety of types of content and functionality that may be included within the pages 110, 112. For example, widgets of the widget generator 104 should be understood to potentially include any and all functionality and features that might be included in any webpage.

In particular, for example, such widgets should be understood to potentially be associated with associated DOM models, which themselves may be rendered by the rendering engine 126, and subject to security policies of the security manager 130. In particular, the widgets may each execute within an individual, associated page context that is separate from the page context of the page 110 and/or the malicious page 112, in the sense of the same origin policy of the security manager 130 described above.

Thus, given that the widgets of the widget generator 104 are understood to include and represent a variety of webpages and associated features and functions of a wide scope and range, the widget provider associated with the widget provider server 106 should similarly be understood to represent a wide range of the types of providers that might wish to generate security-sensitive widgets for embedding within arbitrary webpages (subject to the protective operations of the protection manager 102 described herein).

That is, although the widget provider is described above in the example context of social sharing services, the widget provider should be understood to represent virtually any personal or business interest that might benefit from operations of the protection manager 102 in the system 100 of FIG. 1, and variations thereof. For example, the widget provider might include a provider of business software, a government entity, a news outlet or organization, a bank or other financial services provider, and ecommerce site, or virtually any entity which might benefit from a widespread adoption of its widgets across a number of different web domains and associated pages.

Therefore, for purposes of FIG. 1, the widget provider server 106 should be understood to represent any appropriate hardware/software platform that may be utilized to provide the widget generator 104. As such, the widget provider server 106 is illustrated as including at least one processor 138, along with a non-transitory computer readable storage medium 140. That is, for example, the widget provider server 106 may include a plurality of hardware, semiconductor processors 138, perhaps configured to execute in parallel, which are designed to read instructions stored on the non-transitory computer readable storage medium 140, to thereby provide the widget generator 104. Accordingly, the non-transitory computer readable storage medium 140 should be understood to represent any storage technique and associated hardware/software that may be used to store such executable instructions, as well as any appropriate memory that may be used to store relevant data associated therewith.

Of course, the widget provider server 106 should be understood to include a number of additional hardware/software components associated with providing the widget generator 104 and associated widgets, which are not illustrated in the example of FIG. 1 for the sake of simplicity and conciseness. Moreover, and more generally with respect to FIG. 1, it may be appreciated that the entirety of FIG. 1 is provided as a simplified, concise example context for implementation of the system 100. Therefore, many additional or alternative implementation details may be included in different embodiments of the system 100, some of which are described in more detail below.

For example, although the example of FIG. 1 illustrates a number of separate, discrete components or modules, it may be appreciated that any two or more such components may be combined in any given implementation, for execution as a single component. Conversely, any single component may be implemented as two or more subcomponents. Similarly, components shown as subcomponents of, i.e., included in, larger components, should be understood to be additionally or alternatively implemented as separate components.

Figure 2:
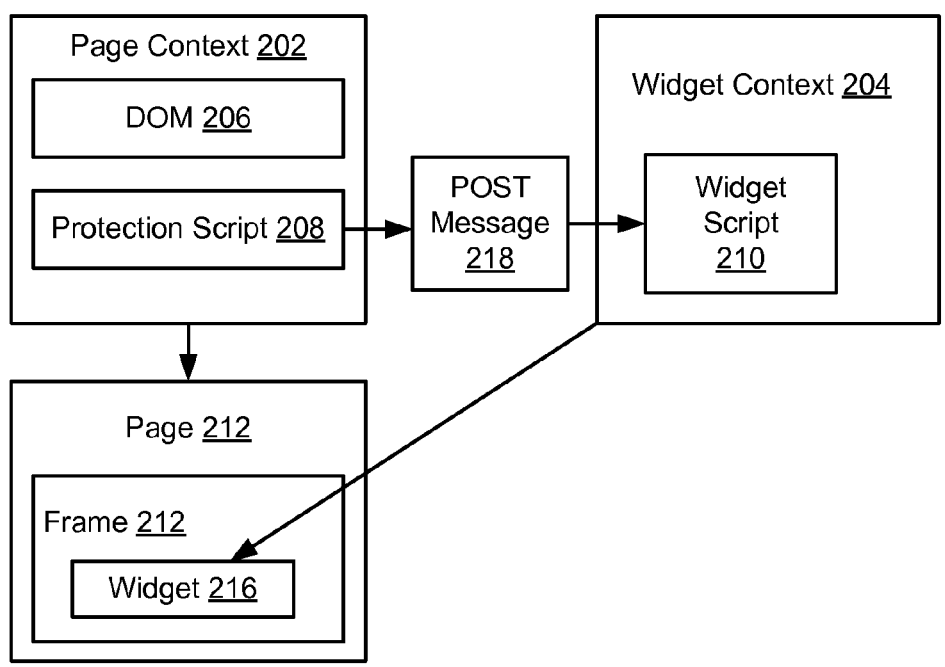
FIG. 2 is a block diagram illustrating example operational details of the system of FIG. 1.

FIG. 2 is a block diagram illustrating example implementation details for the system 100 of FIG. 1. In the example of FIG. 2, a page context 202 refers generally to a rendering and execution context of any page that may be rendered by the rendering engine 126 of the browser application 116, and subject to the security policies (e.g., same origin policy) of the security manager 130, and in conjunction with embedding a widget of the widget generator 104. Thus, the page 110 should be understood to have its own page context corresponding to the page context 202, while, similarly, the malicious page 112 would also have an associated page context, generally represented by the page context 202. Meanwhile, a widget context 204 should similarly be understood to represent a rendering/execution context of any widget provided by the widget generator 104, where each such widget is understood from the above explanation of FIG. 1 to be seamlessly embedded within a corresponding page that is also being rendered by the browser application 116.

In the example of FIG. 2, the term context should be understood in the sense described with respect to the same origin policy of the security manager 130. That is, the page context 202 and the widget context 204 represent parallel renderings and associated operations, which are both provided by the rendering engine 126 in conjunction with the script manager 128 and the security manager 130 of the browser application 116. Thus, operationally, the rendering and associated functionalities should be understood to be equivalent, but, due to the same origin policy of the security manager 130, the contexts 202, 204 are kept separate from one another, and one context may not directly affect, control, have knowledge of, or otherwise interact with the other, except as allowed by the security manager 130 for purposes of implementing specific, narrowly-defined message exchanges or other interactions that are deemed on the whole to provide a net benefit to the widget provider server 106, legitimate page providers, and the end users.

On the other hand, within a single context, such as the page context 202 or the widget context 204, an executing script may have a wide range of knowledge and control. For example, the page context 202 is illustrated as including a DOM 206, which generally represents an associated DOM tree, and associated APIs and properties. Thus, any script executing within the page context 202 may have extensive knowledge of the DOM 206, while having no direct knowledge or control over properties and operations within the widget context 204.

In particular, as shown in FIG. 2, a protection script 208 provided by the protection manager 102 of FIG. 1 may be executed within the page context 202, while a widget script 210 is separately executed within the separate widget context 204. Then, when a page 212 is rendered in conjunction with the page context 202, a frame 214 may be included within the page 212 for purposes of embedding a widget 216 provided in conjunction with the widget context 204 and the widget script 210.

In more detail, in the example, the frame 214 generally represents an inline frame, or iframe, that is associated with a node of the DOM tree of the DOM 206, and that is commonly used to achieve the type of seamless embedding of the widget 216 described above. For example, when a page designer, whether it be a page designer of the legitimate page 110 or the malicious page 112, wishes to include a widget, such as the widget 216, the page designer may include, within a node of a DOM tree of the DOM 206, a frame that specifically and uniquely identifies the widget to be embedded. For example, the frame 214 may refer to a uniform resource locator (URL) of the widget 216, and/or may include a uniquely-assigned identifier provided by the DOM 206 for uniquely identifying the widget 216.

In such scenarios, the page designer may utilize a number of known page design techniques to seamlessly incorporate the widget 216 within the page 212, using the frame 214, in a manner that may be partially or completely undetectable to the end user (who may not have technical knowledge of such techniques). For example, cascading style sheets (CSS) refer to a well-known language for describing content specified by a markup language, such as HTML, and used to define an appearance and format of the content.

In the context of a legitimate page, such as the legitimate page 110, cascading style sheets and related page design techniques may be used to accomplish the described objectives of seamlessly embedding a widget of the widget generator 104, such as the widget 108A, in a manner that is convenient and enjoyable for the end user, while accomplishing objectives of the legitimate provider and the widget provider. On the other hand, the use of CSS and associated techniques may be potentially used by the attack generator 124 of FIG. 1 to attempt to violate conditions specified and required by the protection manager 102, e.g., by the condition inspector 132. For example, in the examples provided above with respect to visibility conditions, which are described in detail below with respect to the use case example of FIG. 8, CSS may be used to hide or obscure the widget 216, in an attempt to trick the end user into executing functionality of the widget 216 in a way which compromises the security of the widget provider server 106 and/or of the end user.

Therefore, in the example implementation of FIG. 2, and with reference to the system 100 of FIG. 1, the widget generator 104 and the protection manager 102 may provide the widget script 210 and the protection script 208, respectively, in conjunction with a providing of the DOM 206 of the page 212 to the browser application 116 of the client system 118. More particularly, the widget script 210 may be provided in a manner which partially or completely disables specified functionality of the widget 216. Then, the protection script 208 may be configured to communicate, using appropriate APIs of the DOM 206, that the widget script 210 has been disabled, and that the widget script 210 will not be enabled and/or included within the frame 214 of the page 212, unless the protection script 208 is permitted to execute within the page context 202, as illustrated in the example of FIG. 2.

Of course, a legitimate page, such as the legitimate page 110, would generally have no objection to such inclusion of the protection script 208 within its associated page context. On the other hand, the malicious provider of the attack server 120 would find inclusion of the protection script 208 within a context of the malicious page 112 to be potentially or definitively problematic, because, as referenced above, the protection script 208 would have, in such scenarios, extensive knowledge and control with respect to features and operations of the DOM 206.

Nonetheless, in example implementations, by preemptively disabling functionalities of the widget 216, the protection script 208 ensures that the widget 216 will not be blindly or arbitrarily included within the malicious page 112. Instead, if the protection script 208 does not receive permission for its inclusion within the page context 202, then the protection manager 102 may refuse to enable or include the widget 216 within the frame 214 of the page 212. On the other hand, if the protection script 208 is permitted to execute within the page context 202, then the condition inspector 132 may proceed to analyze or otherwise inspect the DOM tree of the DOM 206, in order to determine whether one or more conditions specified by the protection manager 102 have been met.

Therefore, in the example of FIG. 2, the protection script 208 may first identify a node of the DOM 206 corresponding to the frame 214, and may thus relate the frame 214 to the widget 216, using the associated widget identifier, as described above. Then, the protection script may proceed to verify the specified condition. For example, the condition inspector 132 may analyze the relevant node of the DOM 206, along with nodes that are determined to be related to the node of the frame 214, such as, e.g., parent nodes of the frame node.

Upon a determination by the condition inspector 132 that a specified condition for the widget 216 has been met, (e.g., the visibility condition referenced above in requiring that the widget 216 be visible within the page 212) the message manager 134 within the protection script 208 may proceed to send a POST message 218 to the widget script 210 within the widget context 204.

In this regard, the POST message 218 should be understood to refer to the POST message API of java script, which was designed to soften the same origin policy of the security manager 130 in existing, conventional page rendering scenarios. For example, conventionally, functionality of the POST message API within java script may be used to enable communications between authorized webpages. In FIGS. 1 and 2, the POST message 218 is used to communicate from within the page context 202 (e.g., the page context of the legitimate page 110, or the page context of the malicious page 112).

Since the protection script 208 is thus understood to be potentially executing within a page context of the malicious page 112, the message manager 134 may be configured to ensure that the POST message 218 is secure, e.g., that a confidentiality and integrity of the POST message 218 are maintained. Consequently, for example, the post message 218 may comply with an authentication or other security technique established by the widget generator 104 and the protection manager 102, prior to the providing of the protection script 208 and the widget script 210 to the page context 202 and the widget context 204, respectively. For example, a shared secret may be established, which may then be included or otherwise implemented by the protection script 208 when generating the post message 218. In this way, the shared secret may be validated by the widget script 210, to thereby ensure that the verified condition determined by the condition inspector 132 actually exists within the page 212. Specific example details of techniques for securely implementing such a shared secret, and related techniques, are provided below, e.g., in conjunction with the use case example of FIG. 8.

Figure 3:
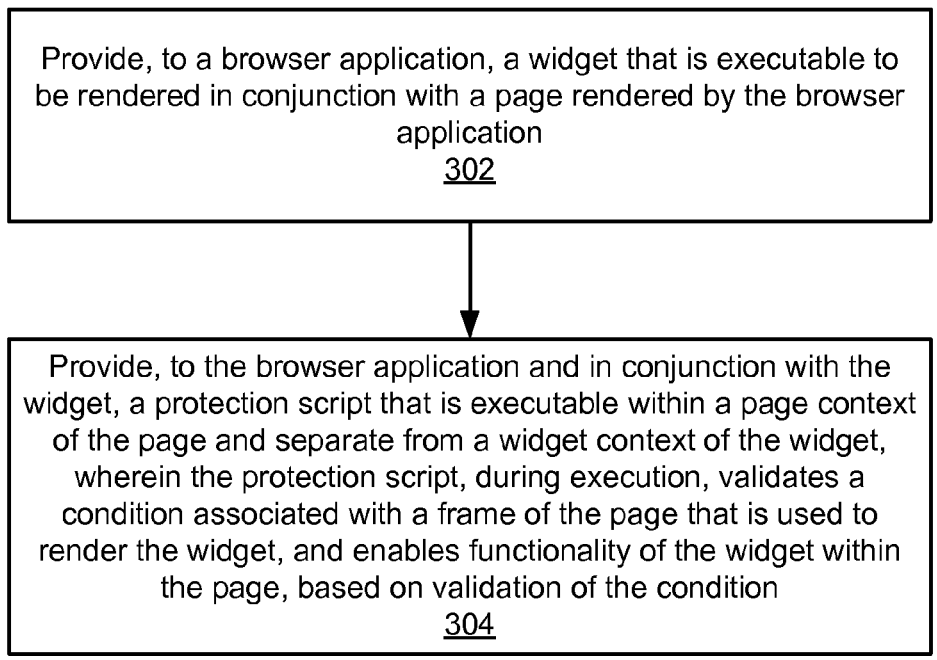
FIG. 3 is a flowchart illustrating example operations of the system of FIG. 1.

FIG. 3 is a flowchart 300 illustrating example operations of the system 100 of FIG. 1, in conjunction with the description provided above with respect to FIG. 2. In the example of FIG. 3, operations 302 and 304 are illustrated as separate, sequential operations. However, it may be appreciated that some or all of the operations 302, 304 may be executed in an overlapping or parallel manner, and that additional or alternative operations may be included, as shown and described below with respect to FIG. 4, while, alternatively, an operation or sub-operation may be omitted in certain implementations. In all such implementations, the various operations included may be executed in a parallel, branched, iterative, looped, or nested fashion, depending on the particular scenarios and design objectives contemplated or anticipated for a given implementation.

In the example of FIG. 3, a widget that is executable to be rendered in conjunction with a page rendered by a browser application may be provided to the browser application (302). For example, as described, the widget generator 104 of FIG. 1 may provide widgets, such as the widget 108A and the widget 108B, to the browser application 116, for rendering therewith in conjunction with pages 110, 112, respectively.

Further in FIG. 3, a protection script may be provided to the browser application in conjunction with the widget, the protection script being executable within a page context of the page and separate from a widget context of the widget, wherein the protection script, during execution, validates a condition associated with a frame of the page that is used to render the widget, and enables functionality of the widget within the page, based on validation of the condition (304). For example, as may be appreciated from the above description of FIGS. 1 and 2, the protection manager 102 may provide the protection script 208 to the browser application 116 in conjunction with the widget 216. As also described, the protection script may be provided for execution within the page context 202 of the page 212, where the page context 202 is separate from the widget context 204 of the widget 216. In this way, the protection script 208, during execution thereof, may operate within the page context 202 to inspect the DOM 206, and thereby validate one or more conditions specified by the protection manager 102, i.e., through operations of the condition inspector 132.

Consequently, upon determination of the validation of the condition, the protection manager, e.g., using the message manager 124, may, in the example implementations, send the POST message 218 to the widget script 210 within the widget context 204, to thereby enable specified functionality of the widget 216 within the frame 214 of the page 212. Of course, as described, if the condition inspector 132 is not able to validate the specified condition, then corresponding functionality of the widget 216 may remain partially or completely disabled, until if and when the condition is validated.

Of course, it may be appreciated that FIG. 3 provides a relatively high level example operational flow of implementations of the system 100 of FIG. 1. Consequently, it may be appreciated that, as referenced above, many additional or alternative operations or sub-operations may be included. For example, various implementation details with respect to a manner in which the protection script 208 securely notifies the widget script 210 of the validation of the condition are referenced above, and described in detail below, e.g., with respect to the use case example of FIG. 8. Further, the change monitor 136 of the protection manager 102 may be understood to further modify operations of the protection manager 102, e.g., by requiring subsequent operations of the condition inspector 132 in order to ensure that the validated condition continues to exist within the context of a given page 212.

Figure 4:
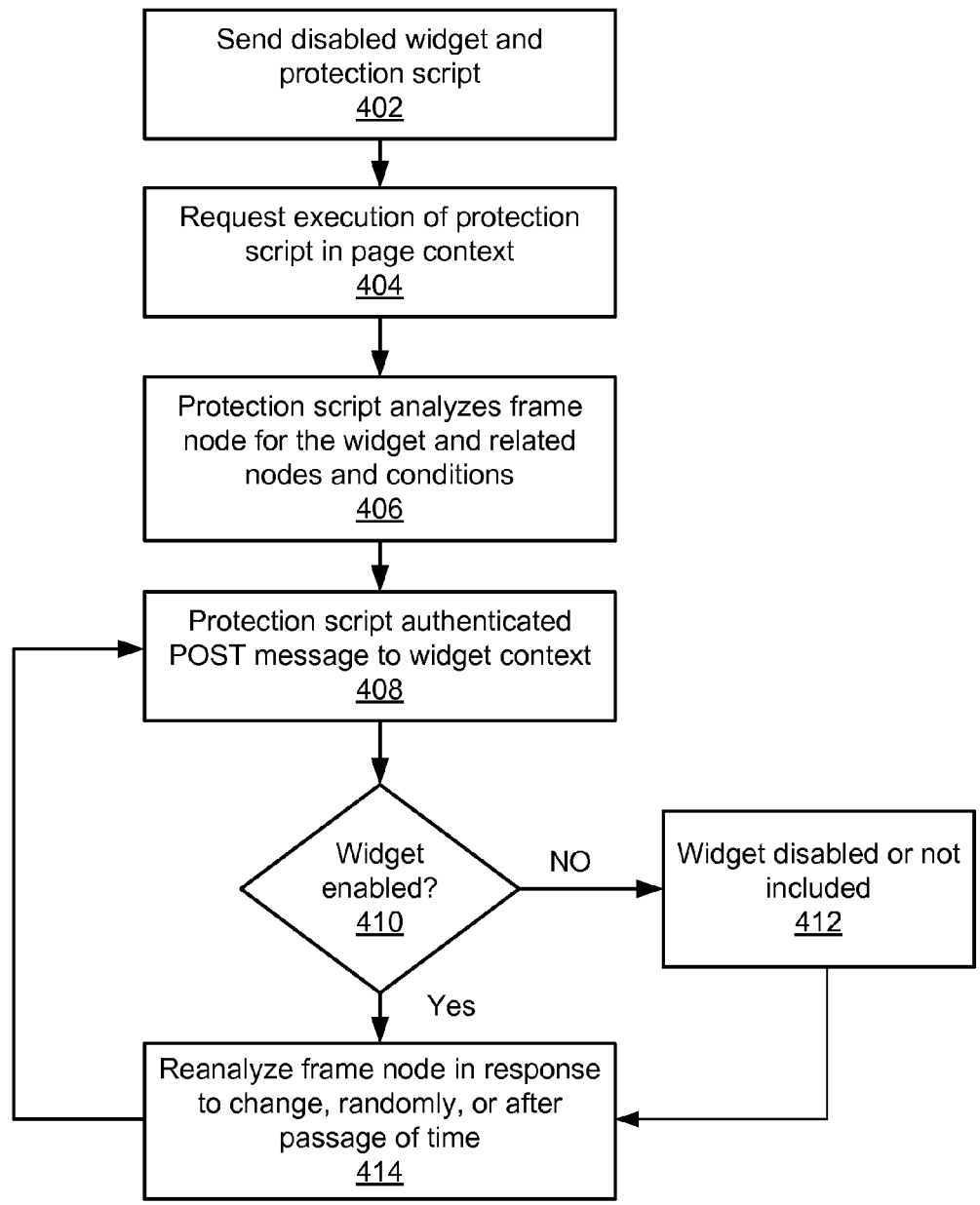
FIG. 4 is a more detailed example flowchart illustrating operations of the system of FIG. 1.

Thus, FIG. 4 is a flowchart 400 illustrating more detailed examples of such additional or alternative operations. Specifically, in the example of FIG. 4, operations begin with the sending of a disabled widget and associated protection script to a client system in conjunction with downloading of a page that specifies and identifies the widget for inclusion/embedding therein (402). For example, the page 110, or the page 112, when downloaded by the browser application 116 to the client system 118, may identify the widget generator 104 of the widget provider server 106, and may thereby automatically initiate generation and downloading of a widget of the widget generator 104. Thus, as described, the protection manager 102 may simultaneously and automatically generate a corresponding protection script instance for inclusion within the thus-generated widget.

At the browser application 116, e.g., with respect to the rendering engine 126 and the script manager 128, the protection script 208 may request (e.g., may demand or mandate) its own execution within the page context 202 of the requesting page (404). As already described, it is a good assumption that the page in question, having already requested inclusion of the widget in question, is designed to include functionality of the widget, and therefore an incentive exists to comply with requests of the protection script 208, in order to enable the disabled widget and obtain the desired functionality thereof.

Thus, once within the page context 202, the protection script 208 (e.g., the condition inspector 132), is enabled to analyze a frame node of the DOM 206 that is associated with the requested widget 216, along with nodes and conditions of the DOM 206 that related to the frame node in question, to thereby determine whether the specified condition has been met (406), In example implementations, described below in more detail with respect to FIGS. 5-7, the same protection script or portion thereof, or a separate integrity validation script, may be configured to also validate an integrity of the DOM 206, so as to ensure that information obtained about the checked condition is valid.

The protection script 208 may thus send the authenticated POST message 218 to the widget script 210 within the widget context 204 (408). In particular, if the message manager 134 of the protection script 208 is informed by the condition inspector 132 that the specified condition could not be successfully validated, then the message manager 134 will send the authenticated post message 218 with a corresponding validation failure notification. In such a case, the widget should not be enabled (410) so that the widget 216 is either disabled or not included within the frame 214 of the page 212 (412). On the other hand, if the condition inspector 132 determines that the condition has been successfully validated, then the protection script 208 may proceed to send the authenticated post message indicating the successful condition validation, at which point functionality of the widget 216 may be enabled (410).

After enabling of the widget 216, or after a determination that the widget 216 should remain disabled (412), the change monitor 136 may determine a trigger for reanalyzing the frame node of the DOM 206 (414). For example, such a trigger may include an actual detected change within the page context 202 that has been predetermined to potentially affect the specified condition. In other examples, the trigger may be configured to initiate further analysis in a random fashion, or after some predetermined passage of time. In any case, in these and other scenarios, the protection script 208 may proceed to attempt to validate the condition again, thereby resulting in a subsequent authenticated POST message of the widget script 210 (408) and a subsequent determination (410) to disable or not include the widget (412), or to continue in the illustrated, iterative loop of checking the condition in question (414).

Thus, as shown in FIG. 4, a determination that the condition could not successfully be validated, and subsequent disabling or non-inclusion of the widget in question, may not, in all implementations, be a final determination. Instead, as shown, following a disabling or non-inclusion of the widget, the various triggers described with respect to the operation 414 may nonetheless be determined by the change monitor 136. Consequently, it may occur that the widget 216 initially remains disabled within the page 212. However, after a passage of time or other trigger event, a subsequent condition inspection may result in a determination of the condition being validated at that point in time, so that the widget 216 may thus be enabled. Thus, it may be appreciated that the widget 216 may be enabled and/or disabled a number of times during a series of interactions with the end user of the client system 118. For example, in the examples provided above in which the required condition is a visibility condition for the widget 216, it may occur that a legitimate reason initially exists for the widget 216 not to be visible within the page 212, such as when the widget 216 is not intended to be displayed until after a particular selection or other interaction by the end user.

The examples of FIGS. 1-4 illustrate example implementations which are designed to circumvent a malicious intent of an attack provider of the attack server 120, or to otherwise ensure that a desired condition is met, prior to permitting an embedding of a functional widget of the widget generator 104. In some cases, the techniques described above with respect to FIGS. 1 and 2 may be sufficient to ensure a desired type or level of security with respect to a given widget or type of widget provided by the widget generator 104. Nonetheless, as is the case in virtually all scenarios related to malicious network attacks, it may be anticipated that malicious attackers will continue to attempt to partially or completely circumvent any new or additional security measures, including the security measures described above with respect to FIGS. 1 and 2.

Consequently, it may be appreciated that the system 100 of FIG. 1 may be supplemented with additional or optional techniques which anticipate such attempts to circumvent the already-described techniques of FIGS. 1 and 2. For example, as referenced above, the system 500 of FIG. 5, and associated example operations provided in conjunction with flowcharts 600 and 700 of FIGS. 6 and 7, respectively, illustrate examples of such techniques that may beneficially be included in implementations of the system 100. Specifically, as illustrated and described below, such techniques anticipate potential violations of an integrity of a DOM of a page, and provide techniques for validating a DOM integrity.

Thus, such techniques may be utilized to provide additional or optional enhancements in the operations of the system 100 of FIG. 1. Alternatively, as also described below, the system 500 of FIG. 5 and associated example operations of FIGS. 6 and 7 may be used independently of some or all of the techniques and scenarios described above with respect to FIGS. 1 and 2. Consequently, the systems 100 and 500 of FIGS. 1 and 5, respectively, should be understood to provide, alone or in combination, extensive protection against various types of network attacks.

More specifically, as just referenced, the system 100 of FIG. 1 relies on execution of the script, e.g., the protection script 208, in the scope of a web document that is controlled by an untrusted third party, e.g., the malicious page 112 of the attack server 120. Consequently, although the protection manager 102 may ensure that the protection script 208 is executed within the page context 202, as described above, the protection manager 102 nonetheless lacks control over exactly when or how the protection script 208 is included in the page context 208.

As a result, the attack provider providing the malicious page 112 may attempt to apply changes to the DOM 206, e.g., changes to a global object of the DOM 206 and/or to the corresponding DOM APIs or properties, which has the potential to disrupt some of the assumptions used in the above described implementations of the system 100 of FIG. 1. For example, changes to DOM APIs may result in the APIs returning incorrect or untrue characteristics of associated DOM nodes.

As a result, the attack provider may circumvent the above described operations of the protection manager 102. For example, the DOM 206 may be manipulated to hide or misrepresent DOM nodes related to the node associated with the frame 214, or may otherwise alter DOM properties in a manner which causes the condition inspector 132 to erroneously validate compliance of the page 212 with required conditions, e.g., visibility conditions. Using similar techniques for violating an integrity of the DOM 206, other types of illegal, illicit, or undesirable activities may be attempted, some examples of which are provided below.

Figure 5:
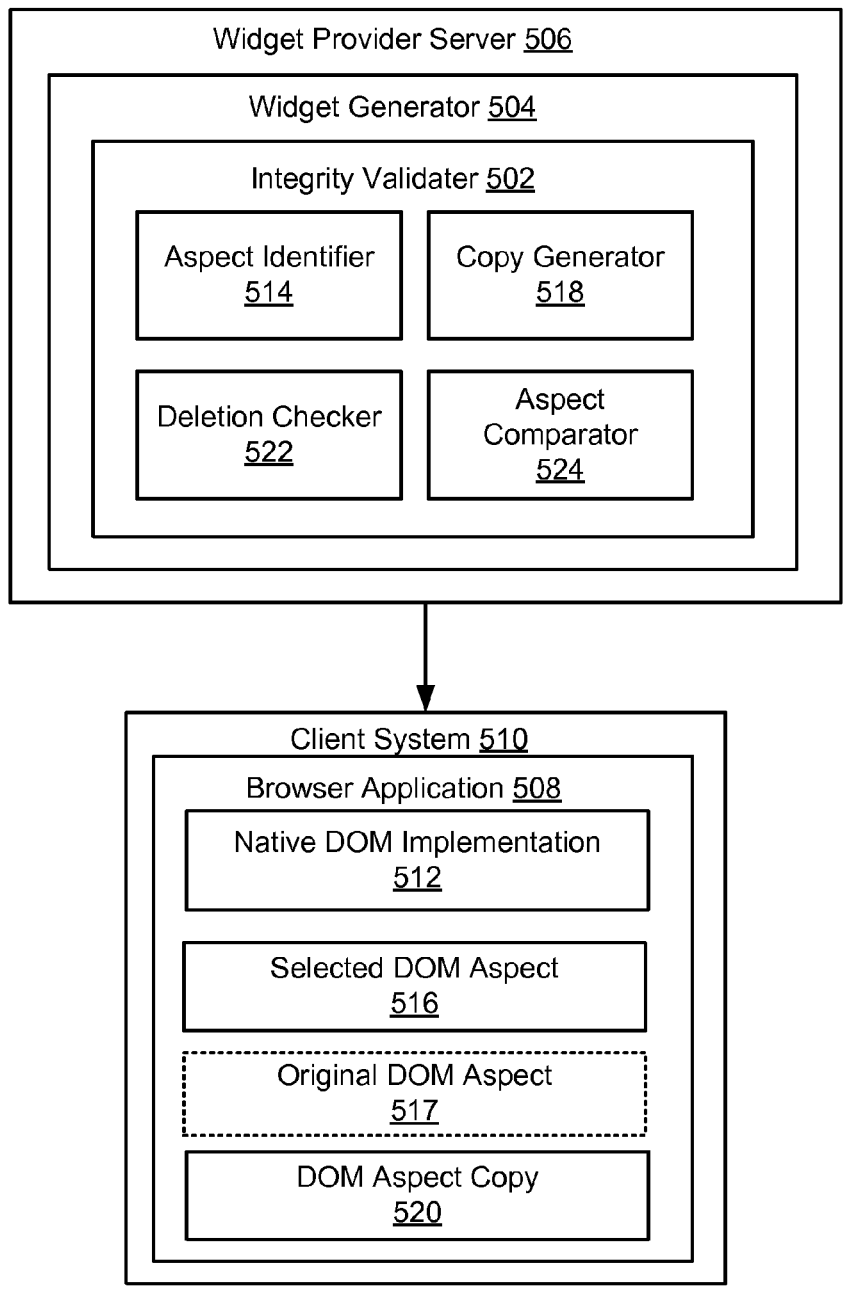
FIG. 5 is a block diagram of a system for validation of page integrity.

In the example of FIG. 5, an integrity validator 502 is illustrated as being included within a widget generator 504 of a widget provider server 506. In this regard, it may be appreciated that the widget provider server 506 may represent the same widget provider server 106, or a different widget provider server. That is, for example, the widget generator 104 of FIG. 1 may be understood, in some implementations, to implement both the protection manager 102 and the integrity validator 502 together. Specific examples of such implementations are discussed below, e.g., in conjunction with the use case of FIG. 8. However, in other implementations, and as illustrated in the example of FIG. 5, the integrity validator 502 may be implemented independently of the protection manager 102, or of the widget generator 504, depending on a nature of threats that are anticipated to occur.

Further in FIG. 5, a browser application 508 is illustrated as executing within the client system 510. It will be appreciated that both the widget provider server 506 and the client system 118, including the browser application 116, are explicitly illustrated in the example of FIG. 1 as including various components and features that are not explicitly reproduced in the example of FIG. 5. Of course, the example of FIG. 5 should be understood to represent a simplified version of these related components of FIG. 1, so that the description provided above with respect to such components should be understood to apply as well in the example of FIG. 5.

In the browser application 508, native DOM implementation 512 (i.e., native to the specific type, brand, or version of the browser application 508) is illustrated as representing a number of native DOM elements and DOM APIs that are conventionally exposed to java script. Table 1, below, provides examples of such method that may be associated with such native DOM APIs and native DOM properties, along with a corresponding scope of each that may be affected by changes thereto, where, as described in detail below, each such scope of potential changes and associated effects represent an extent to which the DOM in question should be checked in order to validate an integrity of the DOM.

TABLE 1

| Name | Type | Checking scope |
| --- | --- | --- |
| getComputedStyle | DOM method | window |
| getElementById, | DOM method | document |
| getElementsByTagName | | |

TABLE 1-continued

| Name | Type | Checking scope |
| --- | --- | --- |
| defineProperty | DOM method | all DOM nodes[1] |
| addEventListener | DOM method | window & position guard |
| contentDocument, postMessage | DOM property | widget iframe |
| parentNode, offsetParent | DOM property | all DOM nodes |
| offsetLeft, offsetTop | DOM property | all DOM nodes |
| offsetHeight, offsetWidth | DOM property | all DOM nodes |

That is, Table 1 should be understood to represent example DOM methods and properties that are native to a particular type of the browser application 508. Therefore, by definition, such methods/properties should be understood to vary from browser to browser, so that Table 1 should be understood as a non-limiting example(s) that may be different for different browsers.

In Table 1, and in general, the native DOM implementation 512 is subject to redefinitions of APIs, properties, or other aspects thereof, when manipulated by appropriately designed java script code. For example, an aspect (e.g., API, method, or property) of a DOM of a page, such as the DOM 206 of the page 212, may be subject to redefinition through direct assignment by associated java script code. Alternatively, the java script command "Object.defineProperty" may be utilized to change existing objects, properties, or other DOM aspects. In the latter regard, for example, object properties may be changed through applied definitions of the known internal DOM properties of [[get]], [[set]], and [[value]] properties. Further, by setting the internal property [[configurable]] to "false," java script code may prevent deletion of, or further changes to, a specified DOM property, API, or other aspect.

Further, redefinition of existing APIs and properties is not restricted to objects that have been created through java script code. Additionally, native APIs and objects of the browser application 508 may be redefined, including, for example, the overwriting of global browser or DOM APIs, which may then affect potentially any aspect of the DOM in question, and thus of any page ultimately rendered therefrom.

Therefore, the integrity validator 502 includes an aspect identifier 514 that is configured to compile a complete list of all native DOM APIs and DOM properties used by a java script executing in conjunction with a page DOM, such as the protection script 208 executing in conjunction with the DOM 206 of the page 212 of FIG. 2, or, more generally, for any java script executing in conjunction with any page DOM. Thus, the aspect identifier 514 may compile such a list of all script-relevant aspects of the native DOM implementation 512, including an associated applicable checking scope, as already referenced above with respect to Table 1.

In the example of FIG. 5, a selected DOM aspect 516 is illustrated which represents one such DOM aspect, e.g., any of the DOM method/properties of Table 1, which is currently identified and selected by the aspect identifier 514 for subsequent integrity validation operations of the integrity validator 502. Specifically, as shown, a copy generator 518 of the integrity validator 502 may be configured to create a DOM aspect copy 520 that is effectively a copy of the selected DOM aspect 516. Through the use of the DOM aspect copy 520, operations of the integrity validator 502 may be executed with respect to the selected DOM aspect 516, while ensuring that the selected DOM aspect 516 is not lost in conjunction with such operations.

For example, a deletion checker 522 of the integrity validator 502 may be configured to attempt to delete the selected DOM aspect 516, once the DOM aspect copy 520 is present. In operation, the deletion checker 522 relies on a manner in which DOM space instances of the native DOM implementation 512 are implemented. Specifically, when native DOM APIs and properties of the native DOM implementation 512 are exposed to java script, the actual, underlying implementation of the native DOM APIs and properties are provided within built-in host objects, which are themselves, in many browser applications, immutable and unchangeable. These built-ins serve as prototype objects for the native DOM objects, such as "window," "object," or "document." Thus, specific DOM space instances of native DOM objects merely provide references to the corresponding portions of the native DOM implementation 512.

In operation, the "delete" operator removes a property from an object. However, if a property with the same name exists on the related prototype object, the DOM space instance of the object will inherit that property from the prototype, which, as just described, in the case of host objects, is not changeable. In other words, redefining aspects of the native DOM implementation 512 effectively creates a corresponding new property or aspect within the native object's current DOM space instance, which effectively shadows the native prototype. If this shadowing property (e.g., a redefined DOM API or redefined DOM property) is deleted, then the underlying prototype implementation will be inherited, as just described, and will therefore effectively reappear within the DOM space instance.

In other words, as illustrated and described below with respect to FIGS. 6 and 7, the deletion checker 522 may be configured to attempt to delete the selected DOM aspect 516, in order to determine whether the selected DOM aspect 516 is a redefined, shadow version of an underlying, corresponding aspect of the native DOM implementation 512. Specifically, as may be appreciated from the above explanation, in scenarios in which the selected DOM aspect 516 is in fact a redefined, shadow version of the corresponding DOM aspect of the native DOM implementation 512, then successful deletion of the selected DOM aspect 516 by the deletion checker 522 will result in a reappearance of the underlying DOM aspect within the native DOM implementation 512, illustrated in the example of FIG. 5 as original DOM aspect 517.

In order to determine whether a DOM aspect which reappears or reemerges following a deletion of the selected DOM aspect 516 is in fact the original DOM aspect 517, an aspect comparator 524 of the integrity validator 502 may be configured to compare any DOM aspect that reappears following a deletion of the selected DOM aspect 516 with the corresponding original DOM aspect of the native DOM implementation 512. Alternatively, the DOM aspect that reappears following deletion of the selected DOM aspect 516 may be compared with the DOM aspect copy 520, to determine whether the reappearing DOM aspect is different therefrom.

In other words, in scenarios in which no aspect of the native DOM implementation 512 has been redefined through exposure to java script, the selected DOM aspect 516 will be deleted by the deletion checker 522, and the original DOM aspect 517 will reappear and will thus be identical to the DOM aspect copy 520. On the other hand, if the selected DOM aspect 516 has been redefined through exposure to java script, then deletion of the selected DOM aspect 516 will result in reappearance of the original DOM aspect 517, which, in such scenarios, will therefore be different from the DOM aspect copy 520 of the selected DOM aspect 516, as determined by the aspect comparator 524.

In some implementations, a malicious provider of the malicious page 112, or other malicious page, may attempt to set the internal DOM property [[configurable]] to false, as part of java script operations designed to redefine DOM aspects and break an integrity of an underlying DOM. In such cases, the setting of the internal property [[configurable]] to false will prevent deletion of the associated DOM aspect.

As a result, in such implementations, any attempt by the deletion checker 522 to delete the selected DOM aspect 516 may, in many circumstances, provide a reliable indication of redefinition of a selected DOM aspect 516, without requiring the comparison operations of the aspect comparator 524 referenced above. For example, in the case of DOM APIs, deleting unchanged references to host APIs should also succeed, so that a failure of a delete operation when the selected DOM aspect 516 represents a DOM API may be sufficient, by itself, to determine that the selected DOM aspect 516 has been redefined.

Additional example operations of the integrity validator 502 are provided below, e.g., with respect to FIGS. 6-8. However, generally speaking, it may be appreciated that the system 500 provides for reliable DOM integrity validation, or, at least, prevents any associated security risks when unable to complete an integrity validation successfully, without disrupting a rendering or other operations of the page and associated DOM being validated. For example, it is known that redefinition or wrapping of native APIs may be used for legitimate reasons, such as to provide a developer with enhanced capabilities. Therefore, when the integrity validator 502 determines that the selected DOM aspect 516 has been redefined, the integrity validator 502 need not actually determine that the integrity has been maliciously broken, since, in many situations, a legitimate provider of a page may have legitimate reasons for redefining or wrapping associated DOM APIs.

Through the inclusion of the DOM aspect copy 520, then, the integrity validator 502 may ensure that the selected DOM aspect 516 may ultimately be left intact at a completion of operations of the integrity validator 502, even when the selected DOM aspect 516 has been determined to be different from the corresponding original DOM aspect 517 of the native DOM implementation 512, or otherwise determined to have been redefined. As a result, the integrity validator 502 may be deployed in a wide range of circumstances and scenarios, without concern that undesirable damage may be done to legitimate pages.

FIG. 6 is a flowchart 600 illustrating example operations of the system 500 of FIG. 5. In the example of FIG. 6, as described above with respect to FIG. 3, operations 602 and 604 are illustrated as separate, sequential operations. However, it may be appreciated that the operations 602, 604 may be executed in a partially or completely overlapping or parallel manner. Moreover, additional or alternative operations or sub-operations may be included, while one or more operations or sub-operations may be deleted or omitted in such implementation. Further, in such implementations, the various additional or alternative operations or sub-operations may be executed in a nested, iterative, looped, or branched fashion.

In the example of FIG. 6, an aspect identifier of an integrity validation script may be provided to a browser application, and, during execution thereof by the browser application when rendering a page, may identify a document object model (DOM) aspect of a DOM of the page (602). For example, with respect to FIG. 5, and as may be understood from the above discussion of the protection manager 102 of FIG. 1, the integrity validator 502 executing on the widget provider server 506 may be understood to provide an integrity validation script, not specifically or explicitly illustrated as such in FIG. 5, which executes within the browser application 508 to provide the aspect identifier 514 for purposes of identifying specific DOM aspects of the native DOM implementation 512. For example, in specific implementations, as described above, the aspect identifier 514 may identify all such aspects of the native DOM implementation 512 that are relevant to a successful execution of a second java script, such as the protection script 208 of FIG. 2.

A copy generator of the integrity validation script may also be provided to the browser application, and, during execution thereof by the browser application when rendering a page, may generate a copy of the identified DOM aspect, wherein the integrity validation script is configured to test an integrity of the DOM based on an attempted deletion of the identified DOM aspect, while maintaining the identified DOM aspect through the copy thereof (604). For example, the integrity validation script provided by the integrity validator 502 may include the copy generator 518 for purposes of generating the DOM aspect copy 520, while the deletion checker 522 may be configured to thereafter attempt to delete the selected/identified DOM aspect 516. As described, subsequent observations and operations following the attempted deletion may be sufficient to determine a validation of integrity of the DOM in question, or, at least, determine that the DOM integrity has essentially been violated, whether for legitimate or illegitimate reasons. Thus, in scenarios in which the integrity cannot be affirmatively validated, the selected DOM aspect 516 may be maintained in its original state through the availability of the DOM aspect copy 520.

Figure 7:
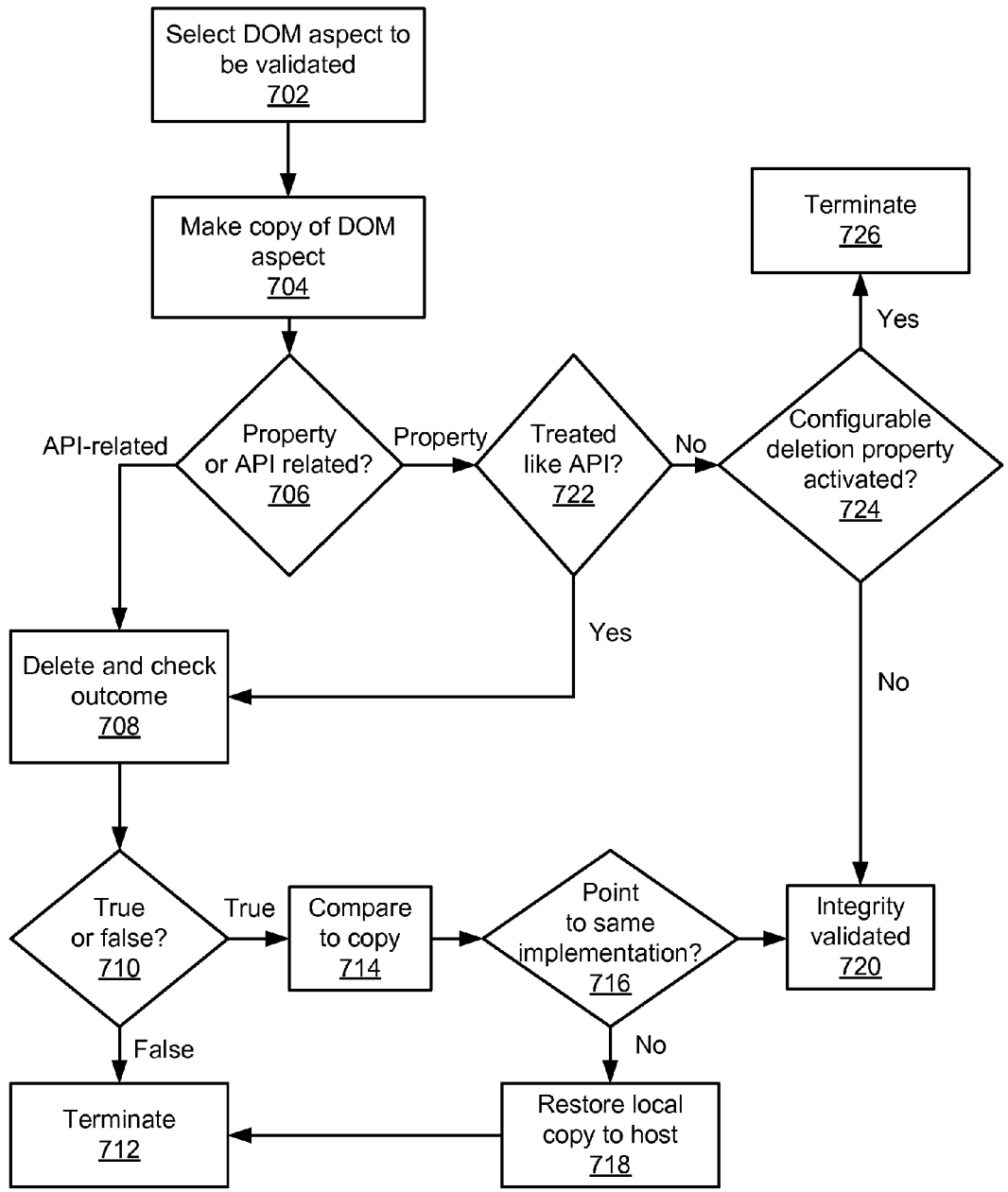
FIG. 7 is a more detailed example flowchart illustrating operations of the system of FIG. 5.

FIG. 7 is a flowchart 700 illustrating more detailed operations of the system 500 of FIG. 5. In the example of FIG. 7, it is assumed that a DOM executing in the context of the native DOM implementation 512 of the browser application 508 is in the process of being validated with respect to an integrity thereof, e.g., by an integrity validation script provided by the integrity validator 502 of FIG. 5.

Thus, in the example of FIG. 7, an initial DOM aspect to be validated may be identified and selected for validation thereof (702), e.g., by the aspect identifier 514. As described, the DOM aspect selected for validation may be identified as being related to another script that is to be executed in the context of the DOM in question, such as the protection script 208 of FIG. 2. In other examples, however, other criteria for DOM aspect selection may be applied, e.g., in some scenarios, all APIs and properties of a given DOM may need to be validated in order to ensure an overall integrity of the DOM in cases in which such integrity is required.

A copy of the DOM aspect may then be generated (704), e.g., by operation of the copy generator 518. In this way, as described above, the DOM aspect copy 520 may be provided. For example, the copy generator 518 may be configured to store a reference to the DOM aspect being investigated in a local variable.

As slightly different validation techniques may be required for different types of DOM aspects, a decision may be made as to whether the DOM aspect includes a DOM property, or is API-related (706). For example, the DOM aspect may be API-related if the DOM aspect is, in fact, a DOM API. In additional examples, the DOM aspect investigated may relate to one or more methods of a particular API, as opposed to the API itself. For example, a determination of which API related aspect should be used for associated validation techniques may be made, for example, based on a type of browser representing the browser application 508 in a particular implementation. For example, with respect to native DOM APIs of the native DOM implementation 512, and as explained above, native APIs cannot be deleted, so that a redefinition thereof merely creates a DOM space reference to the corresponding native DOM API that has the same name as the native DOM API.

In such cases of potential redefinition of the DOM aspect being investigated, the local variable will point to the DOM space implementation of the DOM aspect being investigated. Therefore, a delete operation may be attempted with respect to the selected DOM API, and an outcome of the attempted deletion operation may be checked (708).

As referenced above, if the outcome of the attempted delete operation is false (710), then, because deleting unchanged references to host APIs should always succeed (at least, such an assumption may be made with respect to browser applications having this characteristic), the failing of the attempted deletion operation is a reliable indicator that the DOM API in question has been redefined using "defined property" of a potentially malicious java script to set the internal [[configurable]] property to false, as described above. Consequently, the investigated DOM API is not actually deleted, but the process of the flowchart 700 of FIG. 7 may be terminated (712), because the integrity of the selected DOM API could not be validated.

On the other hand, if the attempted deletion operation is successful (710), then, as described, the native DOM implementation of the selected DOM API will reappear, and may be compared to the previously-generated copy of the selected DOM API (714), for example, by the aspect comparator 524. If both the emergent DOM API and the copied API point to the same native DOM implementation (716), then the integrity of the selected DOM API may be considered to have been validated (720). Otherwise, it may be inferred that the native DOM API was redefined, potentially for malicious reasons, so that the integrity thereof cannot reliably be validated. As a result, and in consideration of the possibility that the selected DOM API was redefined for legitimate reasons, the local copy may be restored to the host object (718), whereupon the attempted integrity validation will again be terminated with negative results (712).

As referenced above, the above description of example operations 706-720 are provided, for the sake of the example, with respect to browser applications which do not allow deletion of native DOM APIs. As also referenced, however, in some cases, a particular browser application may make some exception to this rule, and, for example, may allow deletion of some subset of native DOM APIs. For example, a native DOM API attached to a DOM object, such as "get own property descriptor," may, for some browser applications, be permitted to be deleted.

For affected APIs, however, verification may be attempted by using the same techniques just described with respect to the operations 706-720, but directed to specific methods of the affected DOM API. For example, the described attest may be applied to a "toString( )" method, as the related "function" prototype exposes the correct behavior. In other words, such affected DOM APIs may be checked via application of the above-described techniques to the "toString( )" method, instead of to the corresponding DOM API itself.

Somewhat similarly, as different browser applications may treat specific DOM APIs slightly differently, particular browser applications also may be associated with potential differences in their respective treatment of DOM element properties, such as, for example, "parent NODE" or "offset HEIGHT." Therefore, in scenarios in which the selected DOM aspect is a DOM property (706), then an initial determination may be made as to whether the selected DOM property is treated within the applicable browser application in the manner of a native DOM API (722). If so, then operations 708-720 may precede exactly as described above with respect to API-related DOM aspects.

In other browser applications, however, native DOM properties may be treated differently. For example, a given browser application may specify that the native DOM properties are immutable, so that direct overwriting or redefining via the "define PROPERTY" command has no effect on the property in question. Although, in such scenarios in which no overwriting or redefining is allowed may, by itself, be sufficient to ensure an integrity of a related DOM implementation, other scenarios may exist in which malicious page providers attempt to circumvent the immutability of the native DOM properties in question. For example, a given browser application may allow an irreversible deletion of a particular DOM property, while also allowing a subsequent adding of a new property having the same name as the deleted DOM property to the hosting object. In such cases, the newly-added DOM property would be under a full control of the malicious provider.

In such cases, however, the newly added property would have the same characteristics as all normal java script properties. In particular, its internal [[configurable]] property will act in a normal manner. Specifically, if set to true, the property can be redefined, whereas, if set to false, an attempt to redefine the step would fail with an error message. In other words, if the selected DOM property has the associated [[configurable]] property activated (724), then it may be determined that the selected DOM property has been newly added in conjunction with a previous deletion of the original native DOM property. In such cases, the integrity of the selected DOM property cannot be validated, and the validation process terminates negatively (726). On the other hand, if the [[configurable]] property of a selected DOM property has not been activated (724), then it may be inferred that the selected DOM property is the original, native DOM property, and its integrity may be considered to be validated as such (720).

Pseudo code 1 provides an example for integrity validation techniques for DOM APIs:

Pseudo code 1

```
// Keep a copy for reference
var copy = window.getComputedStyle;
// deletion of unchanged host APIs always returns 'true'
if (delete window.getComputedStyle){
    // Check if the function has changed
    if (window.getComputedStyle == copy)
        [. . . all is ok . . .]
    else
        error("tampered!");
} else {      // delete failed
    // Redefined property with [[Configurable]] set to 'false'
    error("tampered!");
}
```

The example of FIG. 5, and subsequent discussions of FIGS. 6, 7, is mainly provided with respect to the widget generator 504 and associated embedding or inclusion of generated widgets within a potentially malicious page. However, the above discussion also references example scenarios in which the integrity validator 502 may be implemented independently of an associated widget, and/or independently of direct interactions with the end user of the client system 510, and/or with respect to a fourth party provider operating on a webpage in question.

By way of specific, non-limiting example, an otherwise legitimate page provider may violate an integrity of a DOM of its own provided page, for purposes of deceiving a third party, in a manner which may not affect the end user of the client system 510 directly. For example, the page provider may provide a specific page to the end user of the client system 510, and may contract with a third party to provide services in association therewith. Such services may or may not include or require widgets of the widget generator 504. For example, the third party may be contracted to provide advertising or to measure and/or improve a performance of the provided page. For example, the third party may be contracted to collect usage statistics for the page in question.

In such examples, the page provider may be motivated to manipulate results obtained by the third party. For example, the page provider may wish to inflate usage statistics for the page in question, or may otherwise wish to represent an inflated view of an enjoyment or interaction of the end user with the provided page. Consequently, such a page provider may utilize the techniques and associated components described above with respect to FIGS. 5-7, in order to attempt such deception. Meanwhile, the contracted third party may rely on the integrity validation techniques described with respect to FIGS. 5-7 in conjunction with the various techniques for attempting to disrupt the integrity of the page DOM, in order to ensure that usage statistics and other data collected with respect to the provided page are accurate.

In the example just described, as well as in the preceding examples provided with respect to FIGS. 5-7, it should be appreciated that conventional java script implementation in the context of a DOM being rendered is that earlier-executed java scripts are generally given priority over later, subsequently executed java scripts. Consequently, in some scenarios, it may occur that a page provider, a third party provider, and an end user may have a mutually agreeable and acceptable situation for providing and utilizing a specific page, such as when a legitimate page provider and the third party provider work together to provide combined content and services to the end user. In such scenarios, however, a fourth party may attempt to disrupt the otherwise-agreeable relationship for its own purposes.

For example, the fourth party may be a competitor of the third party, or may simply be an example of a malicious attacker. In any case, such a fourth party may attempt to provide its own java script in the context of the page DOM of the provided page. In such cases, if the fourth party script executes ahead of scripts of the page provider or of the third party provider, then the fourth party provider may succeed in disrupting an integrity of the page DOM, e.g., by redefining APIs of the DOM as described above. In such scenarios, it may be appreciated that the integrity validator 502 may be utilized to guard against such malicious, deceitful, illicit, illegitimate, or otherwise undesirable actions of the fourth party, or of the page provider itself.

Of course, as also referenced above, the integrity validator 502 may seamlessly and easily be included in the context of the system 100 of FIG. 1, as an additional technique for protecting operations of widgets provided by the widget generator 104, so as to thereby protect the widget provider server 106 and/or the end user. In particular, FIG. 8 provides a use case scenario in which the protection manager 102 and the integrity validator 502 may be utilized together in the context of a particular widget generator, for purpose of ensuring that widgets provided thereby are visible to the end user while the end user is interacting therewith.

Figure 8:
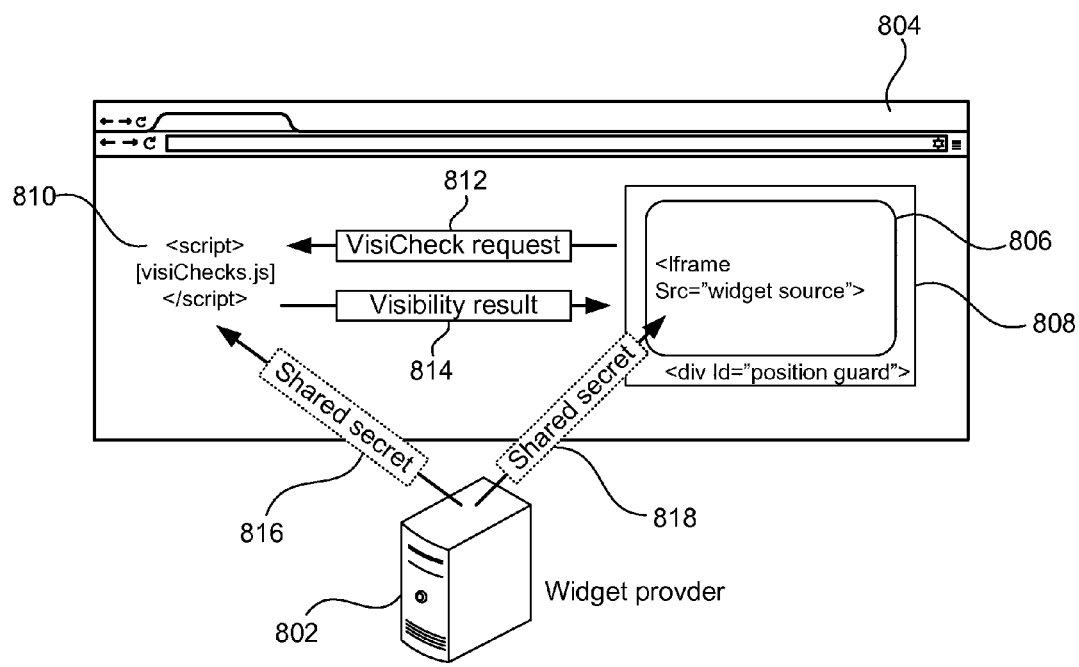
FIG. 8 is a block diagram of a system illustrating an example implementation of the systems of FIGS. 1 and 5, in the context of checking visibility conditions for a third party widget.

Thus, in the example of FIG. 8, a widget provider 802 should be understood to correspond to the widget provider server 106 and/or the widget provider server 506 of FIGS. 1 and 5, respectively, and may include implementations of both the protection manager 102 and the integrity validator 502 (not specifically illustrated in the example of FIG. 8). Then, within a browser and associated browser window 804, an iframe 806 may be associated with a corresponding widget, which may thus be in danger of having its visibility restricted by a malicious UI element. In the example of FIG. 8, an overlay element 808 is illustrated that may be used to guard against a particular type of malicious attack, in which the iframe 806 (and associated widget) is moved by the malicious page provider to be positioned under an anticipated mouse click or other selection of the end user, in order to trick the end user into executing some unintended action that benefits the malicious page provider. Discussion of the overlay 808 and associated attack techniques is provided in more detail below.

In order to ensure a desired visibility condition of the I-frame 806 and the widget to be embedded therein, a visibility checking protection script 810, illustrated in the example of FIG. 8 as [visiCheck.js], is executed within the page context of the page being rendered. As described above, the widget embedded within the iframe 806 may initially be disabled, and may send a request 812 to the visiCheck visibility protection script 810. The visibility protection script may operate as described above with respect to FIGS. 1-4, in order to ensure widget visibility, and may send a resulting visibility result message 814 reflecting the determined visibility condition.

In particular, as also described above, the request 812 and the result 814 may be sent between the page context in which the visibility checking protection script executes and a widget context in which the embedded widget would execute. In order to ensure the security and authenticity of the request 812 and the result 814, the widget provider 802 may include a shared secret 816 with the visibility checking protection script 810, along with a corresponding (e.g., identical) shared secret 818 that is provided within the widget context of the widget to be executed.

Thus, by using the shared secret 816, 818, in conjunction with the post message API provided for cross domain communications, the request 812 and the result 814 may be reliably authenticated. Consequently, functionalities of the embedded widget may be enabled, as long as the visibility result message 814 continues to indicate an acceptable associated visibility condition.

Thus, FIG. 8 illustrates an example use case scenario in which a protection script and integrity validation script are executed in the scope of a webpage or document that may be controlled by an untrusted third party, so that, as described above, the provider of the protection and integrity validation script does not have control over when or how the java script thereof is included within the page. Therefore, a potentially malicious party has an opportunity to apply changes to a global object of the DOM of the page, and corresponding DOM APIs, such as in the description of FIGS. 5-7 above in which DOM APIs are wrapped and/or new DOM properties are created in order to shadow a native DOM implementation.

As a result, the provider of the protection script and the integrity validation script does not know which such changes to the global scope have been conducted by an attacker, or whether such changes have been made at all, without benefit of the integrity validation script of FIGS. 5-7. Moreover, as just referenced with respect to the request 812 and the visibility result 814, all java script within a given webpage or document context is executed in a shared global space, so that all un-scoped objects, functions, and values may be accessed by any java script within the page context. Thus, the use of the shared secret 816, 818 provides a technique for maintaining data values in secret from any malicious attacker. Thus, any embedded widget included in the frame 806 of FIG. 8 should allow seamless user interaction only when predefined visibility conditions have been successfully checked, and an integrity of required DOM APIs and properties, which are needed to execute the visibility check, have been verified.

In some example implementations, both the visibility condition and the integrity validation may be required to be fulfilled for at least a predefined minimum time span for allowing actual user interaction with a widget in question (e.g., 500 milliseconds). In this way, quick property changes made by the malicious attacker immediately prior to a user interaction may be avoided. In further example implementations, if one or more of the visibility condition and integrity validation condition has not been met, the widget in question may be completely disabled with respect to user interaction therewith. In additional or alternative implementations, the widget may utilize a secondary verification step to verify the condition being checked, and may enable the widget based thereon. For example, the widget may utilize confirmation pop-up windows, CAPTCHAS, or similar measures to attempt to clarify whether conditions are suitable to proceed.

In the following description, a more detailed use case scenario for FIG. 8 is provided with respect to a particular type of malicious attack, known as LikeJacking. In the LikeJacking attack, security-sensitive third-party widgets are made arbitrarily available for seamless integration within web pages of web page providers. That is, such widgets may provide certain access to an underlying widget provider server, where such access is intended to be used in a desired, permitted manner, by legitimate, authorized end users. As described, a malicious page provider may attempt to gain such access by tricking the end user into granting the access. In particular, the malicious page provider may attempt to hide or obscure the widget within the rendered page, in a manner which causes the end user to activate the widget in a manner that is unintended by the user, but that benefits the malicious page provider.

There a number of known and possible examples of different conditions that could lead to a DOM element, e.g., a frame including the widget, not being visible to the user. For example, CSS properties may be set that cause the element to be invisible, or obstruction DOM elements may be rendered in front of the element. In other examples, the element's rendering dimensions may be reduced to a nearly invisible size, or the element's position may be set outside the current viewport's boundaries.

The following sections describe how such conditions, and related conditions, can be reliably detected, using the techniques described herein. For example, with respect to CSS-based visibility prevention, several CSS properties exist, that influence the visibility of DOM elements, as shown in Table 2:

TABLE 2

| CSS Property | Check condition | Appl. elements | Method |
| --- | --- | --- | --- |
| visibility | value | element only | getComputedStyle( ) |
| display | value | DOM chain | getComputedStyle( ) |
| mask | value | DOM chain | getComputedStyle( ) |
| opacity | threshold | DOM chain | getComputedStyle( ) |
| position[a] | value | offset chain | DOM properties |
| dimension[a] | minimum | DOM chain | DOM properties |

[a]Values influenced by CSS and DOM position, calculated via DOM properties

For each such property, unambiguous visibility conditions can be defined. For instance, the condition that an element's opacity value has to be above a certain threshold may be defined. Checking these properties via JavaScript is possible via the window.getComputedStyle( ) API, which computes an element's final CSS property values that result after applying all matching CSS rules. While some properties are inherited directly (e.g., the visibility property), most properties have to be checked both for the element itself, as well as for its direct DOM ancestor chain. With the exception of opacity, all checked CSS values are absolute, i.e., the element's visibility is determined through a set of enumerable options. For instance, in the case of the visibility property, the possible values are visible, hidden, or collapse. As an exception, the opacity property value is a composite property, that has to be calculated via multiplying the individual opacity values present in the element's DOM ancestor chain. If a diversion of the predefined condition for one of these CSS properties could be identified, a potential attack is flagged and communicated to the widget.

In another example, obstructing overlays, CSS allows the positioning of DOM elements both in a relative and an absolute fashion. This permits Web developers to create overlays in which one DOM element is rendered on top other elements. This allows the malicious page provider to (partially) obstruct the widget with opaque overlays. Furthermore, through setting the overlay's pointer-events CSS property to none, the overlay will pass all received user interaction to the underlying element, i.e., to the widget. This effectively enables a condition which leaves the widget's own CSS properties untouched.

To detect such situations, all intersecting DOM elements have to be identified. To do so, the protection script may iterate over the embedding DOM tree's nodes and calculate the nodes' position and dimensions. For all (partially) overlapping elements, the pointer-event CSS property is obtained. If overlapping elements with disabled pointer-events are found, a potential attack is flagged. Likewise, in the case where significant portions of the widget are obstructed by standard elements, a potential attack is flagged.

In further examples, side effects of the DOM rendering process can also influence an element's visibility. In particular, the rendered dimensions of an element are of relevance. For example, through setting both the rendering height and width to zero, the element can effectively be hidden.

To avoid such conditions, the widget can define minimum values for width and height. To ensure that the desired minimum dimensions are met, the effective size of an element can be computed. An element's size depends on two factors: The element's own dimensions, determined through the DOM properties offsetWidth and offsetHeight, and the dimensions of its DOM ancestors, under the condition, that one of these ancestors has set its overflow CSS property to hidden. Thus, via walking through the widget's DOM ancestor chain, its effective size can be obtained.

Furthermore, the position of an element can be outside of the currently displayed viewport, hence, effectively hiding it from the user. In general, such a situation is not necessarily an indication that the page is actively attempting to conceal the element. That is, as many pages are bigger than the available screen estate, parts of the Web page may be rendered legitimately outside of the current viewport. This especially holds true for page height, i.e., page regions below the currently viewed content. Hence, further measures, examples of which may be appreciated from the present description, may be needed to distinguish benign from malicious situations.

Another variation for tricking the end user into selecting an unintended function of the widget including quickly moving the click target, e.g., the widget, under the victims mouse pointer, just before a click is about to happen. For example, this attack may be effective in the context of a game or other activity in which the malicious provider is able to predict an upcoming mouse click of the end user.

With visibility checks at isolated, discrete points in time, this attack variant is hard to detect reliably. Hence, for position-changing based attack scenarios, an additional indicator may be used. For example, after the other visibility verification steps have concluded correctly, the protection script may inject an absolutely positioned, transparent DOM overlay 808 of its own, completely covering the widget 806, as well as a small area surrounding it, as shown in FIG. 8 and referenced above. The overlay 808 has the purpose of registering intended interactions with the widget 806 beforehand, using a mouse-over event handler.

Specifically, whenever the end user targets the widget with the mouse pointer, the end user automatically enters the protection overlay. This causes the execution of an event handler of the overlay that serves as a position guard for the widget. The event handler then conducts three steps. First, based on the received mouse event, it verifies that its own position within the DOM layout has not changed. Then it checks whether the widget's visibility and position have been tampered with. If these two tests terminate positively, the overlay temporarily disables its pointer-events, to allow interaction with the widget. Furthermore, the exact time of this event is recorded for use during a corresponding implementation of the secure communications protocol described above between the protection script and the widget context, as described in more detail, below.

The presented visibility checking algorithms have been designed based on documented attack methods as well as on a systematical analysis of relevant DOM-mechanisms. However, it is possible, that attack variants exist which are not yet covered by the outlined checks. Especially, the versatility and power of CSS has the potential of further methods to influence the visibility of DOM elements. However, due to the nature of such attack variants, they may be anticipated to leave traces in the involved elements' DOM or CSS properties. Thus, it can be expected that adding checks for these indicators will be straight forward.

In the example of FIG. 8, as described above, trusted communication is carried out based on the shared secret 816, 818. That is, as described, widget functionality may be disabled until the protection script in the hosting page sends the signal that all required conditions have been met. In the following description, additional example details for implementation of such a secure communication channel is described. Specifically, the two language features of JavaScript of the PostMessage-API and local variable scoping may be used.

As described above, the PostMessage API is a mechanism through which two browser documents are capable of communicating across domain boundaries in a secure manner. A PostMessage can be sent by calling the method postMessage (message, targetOrigin) of the document object that is supposed to receive the message. While the message attribute takes a string message, the targetOrigin represents the origin of the receiving document. In order to receive such a message, the receiving page has to register an event handler function for the \message" event which is triggered whenever a PostMessage arrives.

In this context, the browser application guarantees that a PostMessage is only delivered to the intended recipient, if the targetOrigin specified during the method call matches the recipient window's origin. If confidentiality is not required, the sender may specify a wildcard (*) as targetOrigin. Also, when receiving a message via the event handler function, the browser passes metadata to the receiving page, which includes the origin of the sender. Hence, the PostMessage API can be used to verify the authenticity of the sending page. Effectively, this implies that whenever a widget receives a PostMessage from its embedding page, it is able to obtain reliable information about its embedding context.

In general, the protection script runs in the context of the malicious page. Hence, according to the JavaScript's same-origin policy, any malicious scripts have full access to the shared global object space. Thus, all potentially secret information, such as shared secrets between the protection script and the widget, have to kept out of reach for the adversary's code. One technique for implementing the shared secret 816, 818 of FIG. 8, and related concepts of FIG. 8 and FIGS. 1 and 2, is the use of closure scoping. Pseudo code 2 provides an example, as discussed in detail thereafter:

---
Pseudo code 2
---
```
// Anonymous function without reference in the global object
(function( ){
    // Constructor for the checker object
    var VisiCon = function(s){
        var secret = s; // not visible outside of the object
        [...]
    }
    // Store the secret upon initialization in the closure
    window.VisiChecker = new VisiCon([[. . . shared secret . . .]]);
    ...
})( );
```

All information stored in closures, such as the VisiCon object in Pseudo code 2, are not accessible from the outside. Furthermore, as the encapsulating anonymous function leaves no reference in the global scope, its source code cannot be accessed via toString( ), and, hence, the shared secret value 816, 818 is effectively kept out of reach of the malicious page provider.

Thus, the protection script is implemented in the form of an anonymous function as depicted above, e.g., in Pseudo code 2. Encapsulated in this function is a secret value, representing the shared secret 816, 818, which is provided by the script's host and is shared with the widget. This value will be used to prove the script's authenticity to the widget, as shown in FIG. 8.

Upon initialization, the protection script retrieves the widget's iframe element from the DOM and conducts the visibility verification process. After successful completion of visibility checking and DOM integrity checks as described above, the protection script sends a postMessage, with the shared secret 816, 818, to the widget with the signal that it is safe to enable user interaction. From this point on, the protection script re-executes the visibility and integrity checking process at randomized times, to detect if the widget's visibility or position have been actively tampered with after the initial positive validation.

Finally, a concluding PostMessage handshake is conducted when the widget receives actual user interaction, e.g., through clicking: Before acting on the click, the widget queries the protection script, to ensure that the visibility and integrity properties have not been violated in the meantime. As the widget's position guard 808 must have been triggered right before the interaction with the widget occurred, this information is fresh and reliable. In case the position guard 808 has not been triggered, this is a clear indication that the widget has been moved since the last periodic check, which in turn is a clear sign of potentially malicious actions.

Only in cases in which the position guard 808 has been triggered and the visibility conditions are intact will the protection script answer the widget's inquiry. In turn, the widget only directly acts on the click, if this answer was received.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    at least one microprocessor; and
    instructions that, when executed by the at least one microprocessor, cause the at least processor microprocessor to:
        provide, to a browser application, an aspect identifier of an integrity validation script that, during execution thereof by the browser application when rendering a page, identifies a document object model (DOM) aspect of a DOM of the page; and
        provide, to the browser application, a copy generator of the integrity validation script that, during execution thereof by the browser application when rendering the page, generates a copy of the identified DOM aspect, wherein the integrity validation script is configured to test an integrity of the DOM based on attempted deletion of the identified DOM aspect, while maintaining the identified DOM aspect through the copy thereof.

2. The system of claim 1, wherein the DOM is included within a native DOM implementation of the browser application, and a redefinition of a native DOM aspect results in a DOM-space reference from the redefined DOM aspect to the corresponding native DOM aspect.

3. The system of claim 2, wherein, within the native DOM implementation, the corresponding native DOM aspect is not permitted to be deleted, and deletion of a DOM aspect having a DOM-space reference to its corresponding native DOM aspect results in a reversion to an original state of the corresponding native DOM aspect.

4. The system of claim 3, wherein the attempted deletion results in a successful deletion of the identified DOM aspect, and the integrity validation script includes an aspect comparator, which, during execution thereof by the browser application, compares the copy of the identified DOM aspect to a corresponding native DOM aspect of the identified DOM aspect, and validates an integrity of the identified DOM aspect upon a match therebetween.

5. The system of claim 3, wherein the attempted deletion results in a successful deletion of the identified DOM aspect, and the integrity validation script includes an aspect comparator, which, during execution thereof by the browser application, compares the copy of the identified DOM aspect to a corresponding native DOM aspect of the identified DOM aspect, and determines an invalidity of an integrity of the identified DOM aspect upon a lack of a match therebetween.

6. The system of claim 3, wherein the attempted deletion results in a successful deletion of the identified DOM aspect, and the integrity validation script, during execution, replaces the identified DOM aspect with the copy of the identified DOM aspect following the testing of the integrity.

7. The system of claim 3, wherein attempted deletion results in an unsuccessful deletion of the identified DOM aspect, and the integrity validation script determines an invalidity of an integrity of the identified DOM aspect based thereon.

8. The system of claim 1, wherein the DOM aspect includes a DOM API or method thereof.

9. The system of claim 2, wherein the identified DOM aspect includes a DOM property, and, within the native DOM implementation, the corresponding native DOM property is not permitted to be redefined, but is permitted to be deleted and replaced with an identically-named DOM property.

10. The system of claim 9, wherein the attempted deletion results in a successful deletion or an error message, thereby indicating in either instance an invalidity of an integrity of the identified DOM property.

11. The system of claim 1, wherein the instructions, when executed by the at least one microprocessor, cause the at least one microprocessor to:
    provide, to the browser application, a widget that is executable to be rendered in conjunction with the page; and
    provide, to the browser application and in conjunction with the widget, a protection script that is executable within a page context of the page and separate from a widget context of the widget, wherein the protection script, during execution, validates a condition associated with a frame of the DOM that is used to render the widget, and enables functionality of the widget within the page, based on validation of the condition.

12. A computer-implemented method for executing instructions stored on a non-transitory computer readable storage medium, the method comprising:
    executing an integrity validation script at a browser application to thereby test an integrity of a document object model (DOM) aspect of a DOM of a page rendered by the browser application, the executing including
        generating a copy of the identified DOM aspect,
        executing an attempted deletion of the identified DOM aspect, while maintaining the identified DOM aspect through the copy thereof, and determining the integrity of the DOM aspect, based on the attempted deletion.

13. The method of claim 12, wherein the DOM is included within a native DOM implementation of the browser application, and a redefinition of a native DOM aspect results in a DOM-space reference from the redefined DOM aspect to the corresponding native DOM aspect.

14. The method of claim 13, wherein, within the native DOM implementation, the corresponding native DOM aspect is not permitted to be deleted, and deletion of a DOM aspect having a DOM-space reference to its corresponding native DOM aspect results in a reversion to an original state of the corresponding native DOM aspect.

15. A computer program product, the computer program product being tangibly embodied on a non-transitory computer-readable storage medium and comprising instructions that, when executed by at least one processor, are configured to:
provide, to a browser application, an aspect identifier of an integrity validation script that, during execution thereof by the browser application when rendering a page, identifies a document object model (DOM) aspect of a DOM of the page; and
provide, to the browser application, a copy generator of the integrity validation script that, during execution thereof by the browser application when rendering the page, generates a copy of the identified DOM aspect, wherein the integrity validation script is configured to test an integrity of the DOM based on attempted deletion of the identified DOM aspect, while maintaining the identified DOM aspect through the copy thereof.

16. The computer program product of claim 15, wherein the DOM is included within a native DOM implementation of the browser application, and a redefinition of a native DOM aspect results in a DOM-space reference from the redefined DOM aspect to the corresponding native DOM aspect.

17. The computer program product of claim 16, wherein, within the native DOM implementation, the corresponding native DOM aspect is not permitted to be deleted, and deletion of a DOM aspect having a DOM-space reference to its corresponding native DOM aspect results in a reversion to an original state of the corresponding native DOM aspect.

18. The computer program product of claim 17, wherein the attempted deletion results in a successful deletion of the identified DOM aspect, and the integrity validation script compares the copy of the identified DOM aspect to a corresponding native DOM aspect of the identified DOM aspect, and validates an integrity of the identified DOM aspect upon a match therebetween.

19. The computer program product of claim 17, wherein the attempted deletion results in an unsuccessful deletion of the identified DOM aspect, and the integrity validation script determines an invalidity of an integrity of the identified DOM aspect based thereon.

20. The computer program product of claim 15, wherein the instructions, when executed by the at least one processor, are further configured to:
provide, to the browser application, a widget that is executable to be rendered in conjunction with the page; and
provide, to the browser application and in conjunction with the widget, a protection script that is executable within a page context of the page and separate from a widget context of the widget, wherein the protection script, during execution, validates a condition associated with a frame of the DOM that is used to render the widget, and enables functionality of the widget within the page, based on validation of the condition.

* * * * *